US011777320B2

(12) United States Patent
Moriyama et al.

(10) Patent No.: US 11,777,320 B2
(45) Date of Patent: Oct. 3, 2023

(54) POWER SUPPLY SYSTEM, COUPLING DEVICE, POWER SUPPLY UNIT, AND CONTROL METHOD

(71) Applicant: KYOCERA CORPORATION, Kyoto (JP)

(72) Inventors: Yuichi Moriyama, Kyoto (JP); Takanobu Nishigai, Kyoto (JP); Ryo Goto, Kyoto (JP); Junichi Ujii, Kyoto (JP); Shinya Miyazaki, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/760,097

(22) PCT Filed: Feb. 5, 2021

(86) PCT No.: PCT/JP2021/004452
§ 371 (c)(1),
(2) Date: Aug. 4, 2022

(87) PCT Pub. No.: WO2021/161930
PCT Pub. Date: Aug. 19, 2021

(65) Prior Publication Data

US 2023/0051658 A1 Feb. 16, 2023

(30) Foreign Application Priority Data

Feb. 14, 2020 (JP) ................................ 2020-023002
Feb. 14, 2020 (JP) ................................ 2020-023011
(Continued)

(51) Int. Cl.
*H02J 3/38* (2006.01)
*H02J 7/00* (2006.01)
*H02J 3/32* (2006.01)

(52) U.S. Cl.
CPC ................ *H02J 3/381* (2013.01); *H02J 3/32* (2013.01); *H02J 7/0068* (2013.01)

(58) Field of Classification Search
CPC ...... H02J 3/38; H02J 3/381; H02J 3/32; H02J 7/00; H02J 7/0068
See application file for complete search history.

(56) References Cited

U.S. PATENT DOCUMENTS

2016/0268822 A1 9/2016 Toya

FOREIGN PATENT DOCUMENTS

JP 2015159701 A 9/2015
JP 2016171061 A 9/2016
(Continued)

*Primary Examiner* — Robert L Deberadinis
(74) *Attorney, Agent, or Firm* — HAUPTMAN HAM, LLP

(57) ABSTRACT

A power supply system includes a coupling device including a power conversion device, and one or more power supply units. Each of the power supply units includes a distributed power supply, a first interface outputting DC power to the power conversion device, an individual converter converting the DC power to AC power, and a second interface outputting the AC power output from the individual converter. The power conversion device includes a coupling side converter that converts the direct current power output from the power supply units to AC power, and an interface for outputting the AC power output from the coupling side converter. The power supply system includes a controller for controlling at least one of a corresponding one of the power supply units or the power conversion device based on communication information obtained by communication between the corresponding one of the power supply units or the power conversion device.

13 Claims, 27 Drawing Sheets

10 100 120 121 121 121 121 121 100X 110 202 200X 206 203 205 200(200C) 200(200B) 200(200A) 200(200E) 204 201 200(200D)

(30) Foreign Application Priority Data

Feb. 14, 2020 (JP) ................................. 2020-023033
Feb. 14, 2020 (JP) ................................. 2020-023042

(56) References Cited

FOREIGN PATENT DOCUMENTS

| | | | |
|---|---|---|---|
| JP | 2016220517 | A | 12/2016 |
| JP | 2019118238 | A | 7/2019 |

PATTERN 1

PATTERN 2

PATTERN 3

PATTERN 4

PATTERN 5

··· REMANING AVAILABLE DISCHARGE LEVEL

PATTERN 2

PATTERN 3

POWER SUPPLY SYSTEM, COUPLING DEVICE, POWER SUPPLY UNIT, AND CONTROL METHOD

RELATED APPLICATIONS

The present application is a National Phase of International Application Number PCT/JP2021/004452 filed Feb. 5, 2021 and claims priority to Japanese Application Numbers 2020-023002, 2020-023011, 2020-023033 and 2020-023042 all filed Feb. 14, 2020.

TECHNICAL FIELD

The present invention relates to a power supply system, a coupling device, a power supply unit, and a control method.

BACKGROUND ART

To date, there is a known portable emergency power supply including a power supply unit and an inverter. The emergency power supply includes an interface of direct current power, and charges the power supply unit by direct current power input from the interface (for example, Patent Document 1).

However, usage scenarios are merely assumed in which the emergency power supply described above is used alone at an emergency time, and usage scenarios at a normal time other than an emergency time are not assumed. Thus, the emergency power supply is not used at a normal time, and the usage scenarios of the power supply are limited.

CITATION LIST

Patent Literature

Patent Document 1: JP 2016-220517 A

SUMMARY

A power supply system according to the present disclosure includes a coupling device including a power conversion device, and one or more power supply units detachable from the coupling device. Each of the one or more power supply units includes a distributed power supply, a first electrical power interface configured to output direct current power output from the distributed power supply to the power conversion device, an individual converter configured to convert the direct current power output from the distributed power supply to alternating current power, and a second electrical power interface configured to output the alternating current power output from the individual converter. The power conversion device includes a coupling side converter configured to convert the direct current power output from the one or more power supply units to alternating current power, and a coupling side electrical power interface configured to output the alternating current power output from the coupling side converter. The power supply system includes a controller configured to control at least one of a corresponding one of the one or more power supply units or the power conversion device based on communication information obtained by communication between the corresponding one of the one or more power supply units and the power conversion device.

A coupling device according to the present disclosure includes a power conversion device. The coupling device includes a coupling side converter configured to convert direct current power output from one or more power supply units detachable from the coupling device to alternating current power, a coupling side electrical power interface configured to output the alternating current power output from the coupling side converter, and a controller configured to control the power conversion device based on communication information received from the one or more power supply units.

A power supply unit according to the present disclosure is detachable from a coupling device including a power conversion device. The power supply unit includes a distributed power supply, a first electrical power interface configured to output direct current power output from the distributed power supply to the power conversion device, an individual converter configured to convert the direct current power output from the distributed power supply to alternating current power, a second electrical power interface configured to output the alternating current power output from the individual converter, and a controller configured to control the power supply unit based on communication information received from the power conversion device.

A control method according to the present disclosure is used for a system including a coupling device including a power conversion device, and one or more power supply units detachable from the coupling device. Each of the one or more power supply units includes a distributed power supply, a first electrical power interface configured to output direct current power output from the distributed power supply to the power conversion device, an individual converter configured to convert the direct current power output from the distributed power supply to alternating current power, and a second electrical power interface configured to output the alternating current power output from the individual converter. The power conversion device includes a coupling side converter configured to convert the direct current power output from the one or more power supply units to alternating current power, and a coupling side electrical power interface configured to output the alternating current power output from the coupling side converter. The control method includes controlling at least one of a corresponding one of the one or more power supply units or the power conversion device based on communication information obtained by communication between the corresponding one of the one or more power supply units and the power conversion device.

A power supply system according to the present disclosure includes a coupling device including a power conversion device, and one or more power supply units detachable from the coupling device. Each of the one or more power supply units includes a distributed power supply, a first electrical power interface configured to output direct current power output from the distributed power supply to the power conversion device, an individual converter configured to convert the direct current power output from the distributed power supply to alternating current power, and a second electrical power interface configured to output the alternating current power output from the individual converter. The power conversion device includes a coupling side converter configured to convert the direct current power output from the one or more power supply units to alternating current power, and a coupling side electrical power interface configured to output the alternating current power output from the coupling side converter. The power supply system includes a controller configured to execute predetermined control related to a connection state of a corresponding one of the one or more power supply units to the coupling device.

A coupling device according to the present disclosure includes a power conversion device. The coupling device includes a coupling side converter configured to convert direct current power output from one or more power supply units detachable from the coupling device to alternating current power, a coupling side electrical power interface configured to output the alternating current power output from the coupling side converter, and a controller configured to execute predetermined control related to a connection state of a corresponding one of the one or more power supply units to the coupling device.

A power supply unit according to the present disclosure is detachable from a coupling device including a power conversion device. The power supply unit includes a distributed power supply, a first electrical power interface configured to output direct current power output from the distributed power supply to the power conversion device, an individual converter configured to convert the direct current power output from the distributed power supply to alternating current power, a second electrical power interface configured to output the alternating current power output from the individual converter and a controller configured to execute predetermined control related to a connection state of the power supply unit to the coupling device.

A control method according to the present disclosure is used for a system including a coupling device including a power conversion device, and one or more power supply units detachable from the coupling device. Each of the one or more power supply units includes a distributed power supply, a first electrical power interface configured to output direct current power output from the distributed power supply to the power conversion device, an individual converter configured to convert the direct current power output from the distributed power supply to alternating current power, and a second electrical power interface configured to output the alternating current power output from the individual converter. The power conversion device includes a coupling side converter configured to convert the direct current power output from the one or more power supply units to alternating current power, and a coupling side electrical power interface configured to output the alternating current power output from the coupling side converter. The control method includes executing predetermined control related to a connection state of a corresponding one of the one or more power supply units to the coupling device.

A power supply system according to the present disclosure includes two or more power supply units detachable from a coupling device including a power conversion device. Each of the two or more power supply units includes a distributed power supply, a first electrical power interface configured to output direct current power output from the distributed power supply to the power conversion device, an individual converter configured to convert the direct current power output from the distributed power supply to alternating current power, and a second electrical power interface configured to output the alternating current power output from the individual converter. The power supply system includes a specific electrical power interface configured to output alternating current power in a state where the two or more power supply units cooperate with each other.

A control method according to the present disclosure is used for a system including two or more power supply units detachable from a coupling device including a power conversion device. Each of the two or more power supply units includes a distributed power supply, a first electrical power interface configured to output direct current power output from the distributed power supply to the power conversion device, an individual converter configured to convert the direct current power output from the distributed power supply to alternating current power, and a second electrical power interface configured to output the alternating current power output from the individual converter. The control method includes outputting alternating current power in a state where the two or more power supply units cooperate with each other.

A power supply unit according to the present disclosure is detachable from a coupling device including a power conversion device. The power supply unit includes a distributed power supply including at least a power storage device, a first electrical power interface configured to output direct current power output from the distributed power supply to the power conversion device, a first individual converter configured to convert the direct current power output from the distributed power supply to alternating current power, a second electrical power interface configured to output the alternating current power output from the first individual converter, a third electrical power interface to which alternating current power is input, and a controller configured to execute at least one of charge control that charges the power storage device with the alternating current power input from the third electrical power interface or discharge control that outputs the alternating current power from the second electrical power interface with the direct current power output from the power storage device in a state where the power supply unit is detached from the coupling device.

A control method according to the present disclosure is used for a power supply unit detachable from a coupling device including a power conversion device. The power supply unit includes a distributed power supply including at least a power storage device, a first electrical power interface configured to output direct current power output from the distributed power supply to the power conversion device, a first individual converter configured to convert the direct current power output from the distributed power supply to alternating current power, a second electrical power interface configured to output the alternating current power output from the first individual converter, and a third electrical power interface to which alternating current power is input. The control method includes executing at least one of charge control that charges the power storage device with the alternating current power input from the third electrical power interface or discharge control that outputs the alternating current power from the second electrical power interface with the direct current power output from the power storage device in a state where the power supply unit is detached from the coupling device.

DESCRIPTION OF EMBODIMENTS

Embodiments will be described below with reference to the accompanying drawings. Note that in the following description of the drawings, the same or similar components will be denoted by the same or similar reference signs. However, the drawings are schematic.

Embodiments will be described below with reference to the accompanying drawings. Note that in the following description of the drawings, the same or similar components will be denoted by the same or similar reference signs. However, the drawings are schematic.

First Embodiment

Outline of Power Supply System

An outline of an electrical power supply system according to a first embodiment will be described below.

Figure 1:
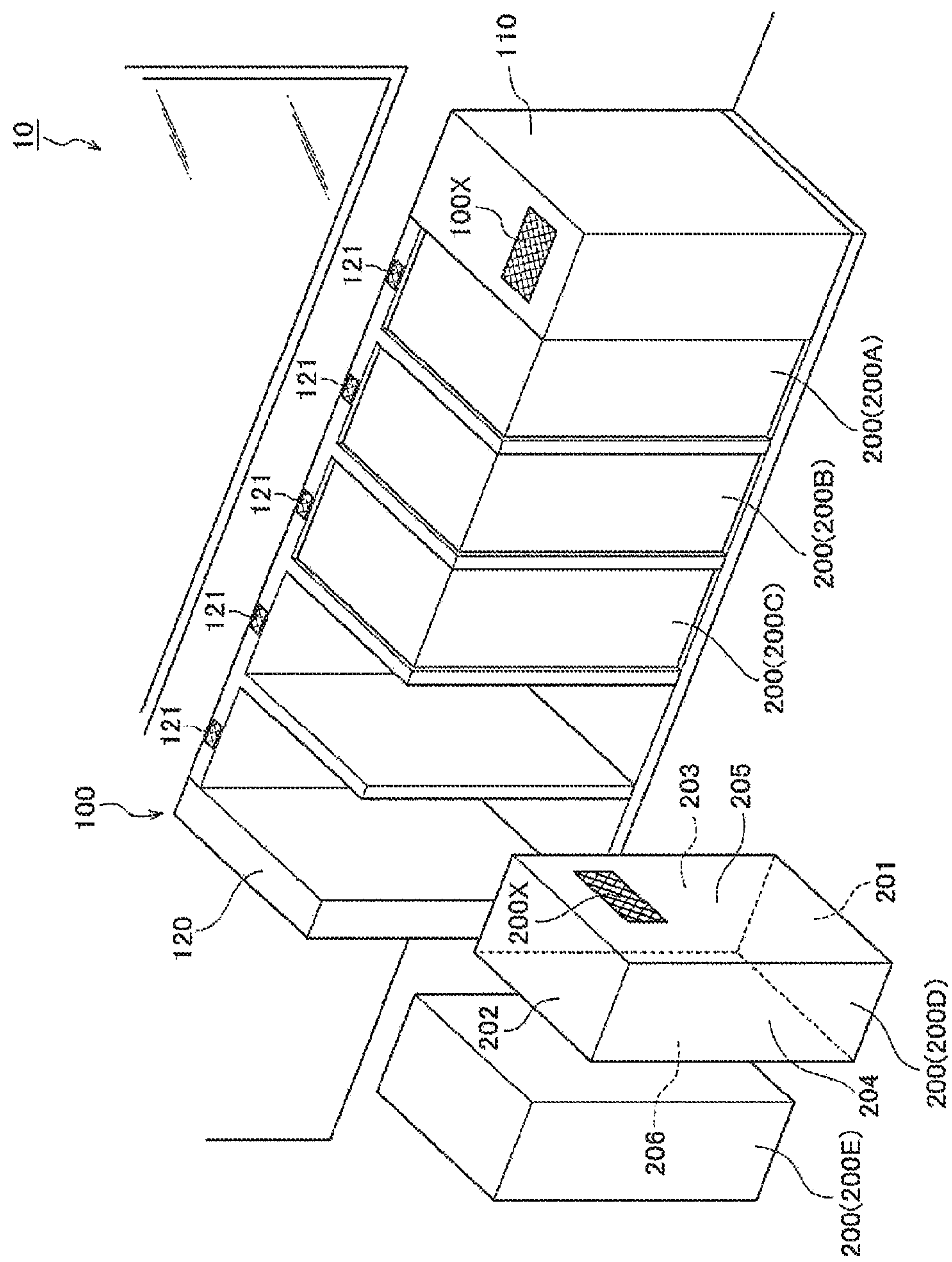
FIG. 1 is a diagram illustrating an outline of a power supply system 10 according to a first embodiment.

As illustrated in FIG. 1, a power supply system 10 includes a coupling device 100 and one or more power supply units 200. Each power supply unit 200 is configured to be detachable from the coupling device 100. In FIG. 1, a case is illustrated in which up to five power supply units 200 (power supply units 200A to 200E) are detachable from the coupling device 100.

The coupling device 100 includes a power conversion device 110 and a housing bay 120. The power conversion device 110 converts direct current power output from the power supply units 200 to alternating current power. The power conversion device 110 converts alternating current power input from a commercial power source (for example, 100 V or 200 V) to direct current power. Details of the power conversion device 110 will be described later. The housing bay 120 can house up to five power supply units 200.

The housing bay 120 may include a display unit 121 for each individual bay housing a corresponding one of the power supply units 200. The display unit 121 may be a 7-segment display, a light emitting element such as an LED, or a display such as a liquid crystal panel or an organic EL. The display unit 121 may be driven by output power of the power conversion device 110, and may be driven by output power of each of the power supply units 200. The display unit 121 may display information related to a corresponding one of the power supply units 200 in a state where the corresponding one of the power supply units 200 is mounted in the coupling device 100. For example, the information related to a corresponding one of the power supply units 200 may include an operating state of the corresponding one of the power supply units 200. The operating state may include a status such as driving, waiting, stopping, or the like. In a case where each of the power supply units 200 includes a power storage device, the operating state may include a status such as discharging, charging, or the like. The operating state may include a status such as an anomaly or the like.

The coupling device 100 may include a display unit 100X. The display unit 100X may be a 7-segment display, a light emitting element such as an LED, or a display such as a liquid crystal panel or an organic EL. The display unit 100X may be driven by the output power of the power conversion device 110. The display unit 100X may display information related to the power conversion device 110, or may display information related to the power supply units 200 mounted on the coupling device 100. For example, the information related to the power conversion device 110 may include an operating state of the power conversion device 110. In addition to the status described above, the operating state may include a status such as a state where the power conversion device 110 is in communication with an electrical power system (interconnected state), and a state where the power conversion device 110 is disconnected from the electrical power system (independent state).

Each of the power supply units 200 includes at least one distributed power supply as described below. The distributed power supply may include one or more devices selected from among a solar cell device, a power storage device, and a fuel cell device. For example, as in the power supply unit 200D, a housing of each of the power supply units 200 may have a shape including a bottom surface 201, a top surface 202, a back surface 203, a front surface 204, a side surface 205, and a side surface 206. In a state where each of the power supply units 200 is housed in the housing bay 120, the bottom surface 201, the back surface 203, the side surface 205, and the side surface 206 may be surfaces (covered surfaces) covered by the housing bay 120, and the top surface 202 and the front surface 204 may be surfaces (exposed surfaces) not covered by the housing bay 120. A solar panel may be provided on the top surface 202 and the front surface 204. A display unit 200X may be provided on the side surface 205 (or the side surface 206). The display unit 200X may be a 7-segment display, a light emitting element such as an LED, or a display such as a liquid crystal panel or an organic EL. The display unit 200X may be driven by the output power of a corresponding one of the power supply units 200. The display unit 200X may display information related to a corresponding one of the power supply units 200 in a state where the corresponding one of the power supply units 200 is detached from the coupling device 100.

Details of Power Supply System

Details of the electrical power supply system according to the first embodiment will be described below. Here, a case will be illustrated in which each of the power supply units 200 includes the solar cell device and the power storage device as the distributed power supply.

Figure 2:
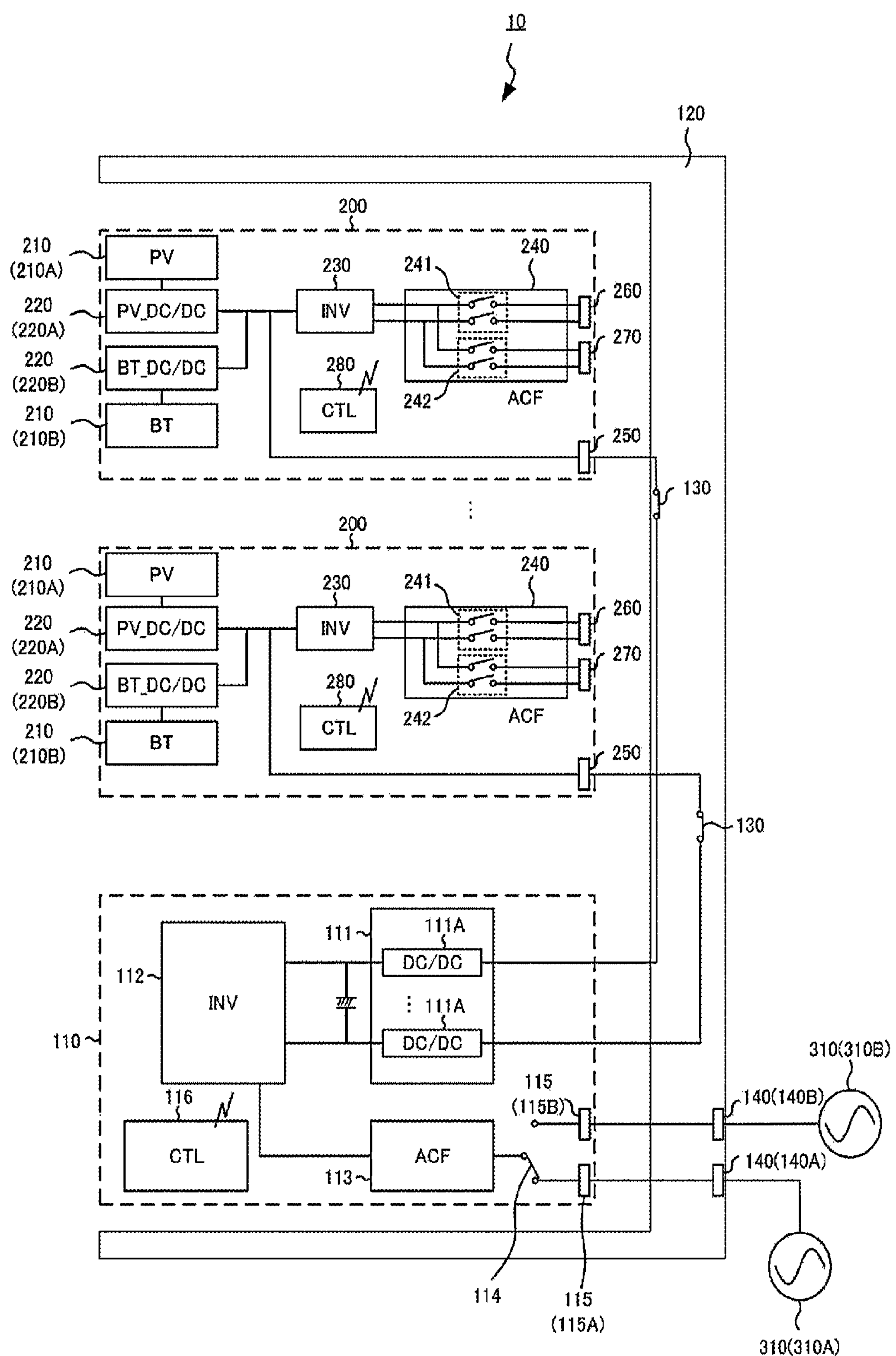
FIG. 2 is a diagram illustrating details of the power supply system 10 according to the first embodiment.

As illustrated in FIG. 2, the power conversion device 110 includes a converter 111, a converter 112, a filter 113, a switching unit 114, electrical power interfaces 115, and a control device 116.

The converter 111 is a DC/DC converter (DC/DC in FIG. 2) for converting the voltage of the direct current power. Specifically, the converter 111 converts the voltage of the direct current power output from the power supply units 200. The converter 111 may convert the voltage of the direct current power output from the converter 112. The power supply units 200 are connected in parallel to the power conversion device 110, and the converter 111 includes a converter 111A provided for each of the power supply units 200.

The converter 112 is an example of a coupling side converter, and is a DC/AC converter (INV in FIG. 2) for converting direct current power output from the converter 111 to alternating current power. The converter 112 may also serve as an AC/DC converter for converting alternating current power output from the filter 113 to direct current power.

The filter 113 is a filter (alternating-current filter (ACF) in FIG. 2) for removing noise components (for example, high frequency components) of the alternating current power output from the converter 112.

The switching unit 114 is a switching unit for switching the electrical power interfaces 115 outputting the alternating current power output from the filter 113. The switching unit 114 may switch the electrical power interfaces 115 for inputting the alternating current power input to the filter 113.

The electrical power interfaces 115 are an example of coupling side electrical power interfaces, and are electrical power interfaces for outputting the alternating current power from the power conversion device 110 (converter 112). The electrical power interfaces 115 may be electrical power interfaces for inputting the alternating current power to the power conversion device 110. The electrical power interfaces 115 may include two or more electrical power interfaces having different output voltages. In FIG. 2, an electrical power interface 115A and an electrical power interface 115B are illustrated as the electrical power interfaces 115. The electrical power interface 115A may be a single-phase two-wire 100 V electrical power interface. The electrical power interface 115B may be a single-phase three-wire 200 V electrical power interface.

The control device 116 is a device for controlling the power conversion device 110 (CTL in FIG. 2). The control device 116 has a function of executing communication with the power supply units 200, and controls the power conversion device 110 based on communication information received from the power supply units 200. Details of the control device 116 will be described later (see FIG. 4).

As illustrated in FIG. 2, the housing bay 120 may include switching units 130 and electrical power interfaces 140.

Each of the switching units 130 switches ON/OFF of connection between a first electrical power interface 250 and the converter 111. Each of the switching units 130 is switched to ON after a corresponding one of the power supply units 200 is housed in the housing bay 120. The switching units 130 need not be provided in the housing bay 120.

Each of the electrical power interfaces 140 is an electrical power interface connected to a corresponding one of the electrical power interfaces 115. In FIG. 2, an electrical power interface 140A connected to the electrical power interface 115A and an electrical power interface 140B connected to the electrical power interface 115B are illustrated as the electrical power interfaces 140. The electrical power interface 140A may be a single-phase two-wire 100 V electrical power interface. The electrical power interface 140B may be a single-phase three-wire 200 V electrical power interface.

As illustrated in FIG. 2, each of the power supply units 200 includes distributed power supplies 210, converters 220, an individual converter 230, a filter 240, a first electrical power interface 250, a second electrical power interface 260, a third electrical power interface 270, and a control device 280.

The distributed power supplies 210 are power supplies for outputting direct current power. In FIG. 2, a solar cell device 210A (PV in FIG. 2) and a power storage device 210B (BT in FIG. 2) are illustrated as the distributed power supplies 210. The solar cell device 210A is a device for outputting direct current power in response to received light. The power storage device 210B is a device for storing electrical power and a device for outputting direct current power.

The converters 220 are DC/DC converters for converting the voltage of the direct current power. In FIG. 2, a converter 220A (PV_DC/DC in FIG. 2) for converting a voltage of the direct current power output from the solar cell device 210A, and a converter 220B (BT_DC/DC in FIG. 2) for converting a voltage of the direct current power output from the power storage device 210B are illustrated as the converters 220. The converter 220B may convert a voltage of direct current power output from the individual converter 230.

The individual converter 230 is a DC/AC converter (INV in FIG. 2) for converting direct current power output from the distributed power supplies 210 to alternating current power. The individual converter 230 may be an example of the first individual converter. The individual converter 230 may also serve as an AC/DC converter for converting alternating current power output from the filter 240 to direct current power.

The filter 240 is a filter (ACF in FIG. 2) for removing noise components (for example, high frequency components) of the alternating current power output from the individual converter 230. The filter 240 may include a switching unit 241 for switching ON/OFF of connection between the individual converter 230 and the second electrical power interface 260. The filter 240 may include a switching unit 242 for switching ON/OFF of connection between the individual converter 230 and the third electrical power interface 270.

The first electrical power interface 250 is an electrical power interface for outputting the direct current power output from the distributed power supplies 210 to the power conversion device 110. The first electrical power interface 250 may also serve as an electrical power interface for inputting direct current power output from the power conversion device 110 to the distributed power supplies 210.

The second electrical power interface 260 is an electrical power interface for outputting the alternating current power output from the individual converter 230. The second electrical power interface 260 may be a single-phase two-wire 100 V electrical power interface.

The third electrical power interface 270 is an electrical power interface for inputting alternating current power. The alternating current power may be input from a commercial power source, and may be input from another power supply unit 200. The third electrical power interface 270 may be a single-phase two-wire 100 V electrical power interface.

The control device 280 is a device (CTL in FIG. 2) for controlling the power supply unit 200. The control device 280 has a function of executing communication with the power conversion device 110, and transmits communication information used for controlling the power conversion device 110 to the power conversion device 110. Details of the control device 280 will be described later (see FIG. 5).

Mounting State of Power Supply Unit 200

In the following, a state where each of the power supply units 200 is mounted in the coupling device 100, that is, a state where each of the power supply units 200 is housed in the housing bay 120 will be described.

As illustrated in FIG. 2, the power supply units 200 are connected in parallel to the power conversion device 110. The first electrical power interface 250 of each of the power supply units 200 is connected (hereinafter, also referred to as DC-link-connected) to the converter 111 of the power conversion device 110. In such a DC link connection, each of the switching units 130 described above is ON, and the switching unit 241 and the switching unit 242 of each of the power supply units 200 are OFF.

Each of the electrical power interfaces 140 described above is connected to a corresponding one of electrical power systems 310. The electrical power systems 310 may include a system (load system) for consuming electrical power supplied from the power conversion device 110. The electrical power systems 310 may include a system (power supply system) for supplying electrical power to the power conversion device 110. In FIG. 2, the electrical power interface 140A is connectable to an electrical power system 310A, and the electrical power interface 140B is connectable to an electrical power system 310B. The electrical power system 310A may be a single-phase two-wire 100 V system, and the electrical power system 310B may be a single-phase three-wire 200 V system.

Detached State of Power Supply Unit 200

In the following, a state where each of the power supply units 200 is detached from the coupling device 100, that is, a state where each of the power supply units 200 is not housed in the housing bay 120 will be described.

Figure 3:
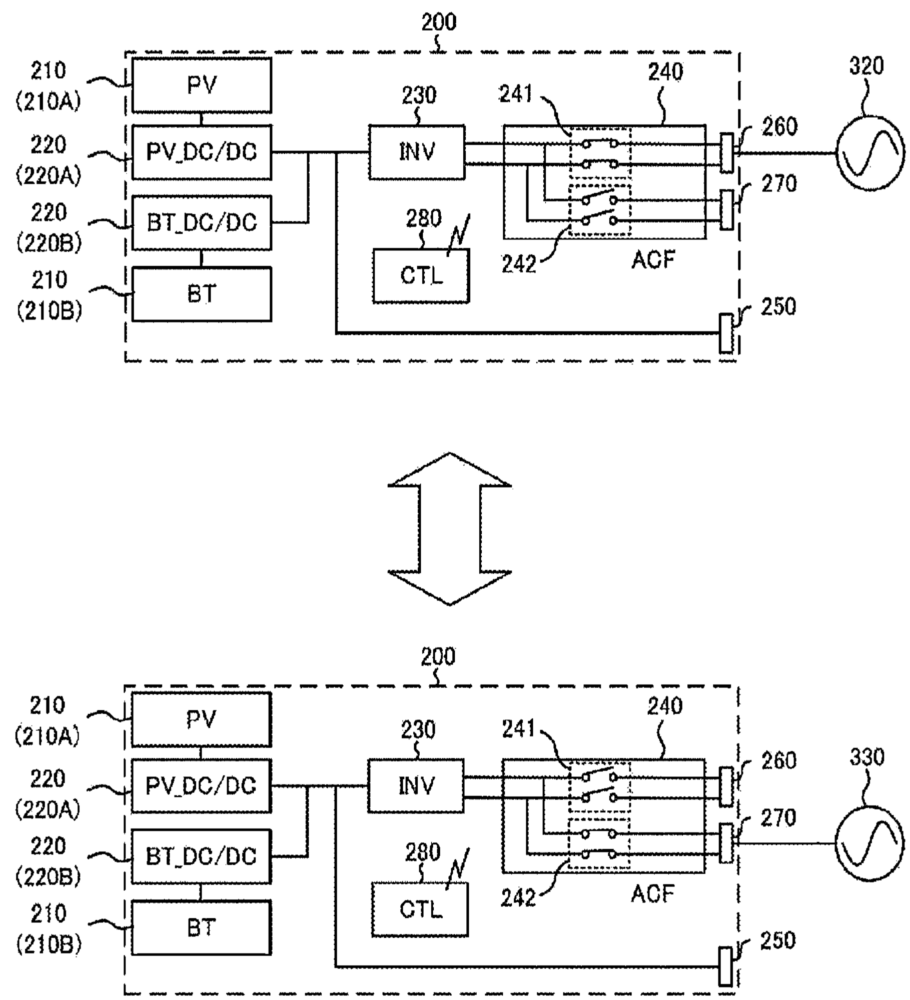
FIG. 3 is a diagram illustrating a detached state of a power supply unit 200 according to the first embodiment.

As illustrated in the upper part of FIG. 3, in a case where a power supply unit 200 outputs electrical power, an electrical power system 320 is connected to the second electrical power interface 260. The electrical power system 320 is a system (load system) that consumes the electrical power output from the power supply unit 200. The electrical power system 320 may be a single-phase two-wire 100 V system. In such a case, the switching unit 241 is ON, and the switching unit 242 is OFF. The first electrical power interface 250 described above is not used.

As illustrated in the lower part of FIG. 3, in a case where electrical power is input to the power supply unit 200, an electrical power system 330 is connected to the third electrical power interface 270. The electrical power system 330 is a system (power supply system) that supplies electrical power to the power supply unit 200. The electrical power system 330 may be a single-phase two-wire 100 V system. In such a case, the switching unit 242 is ON, and the switching unit 241 is OFF. The first electrical power interface 250 described above is not used.

Control Device

Figure 4:
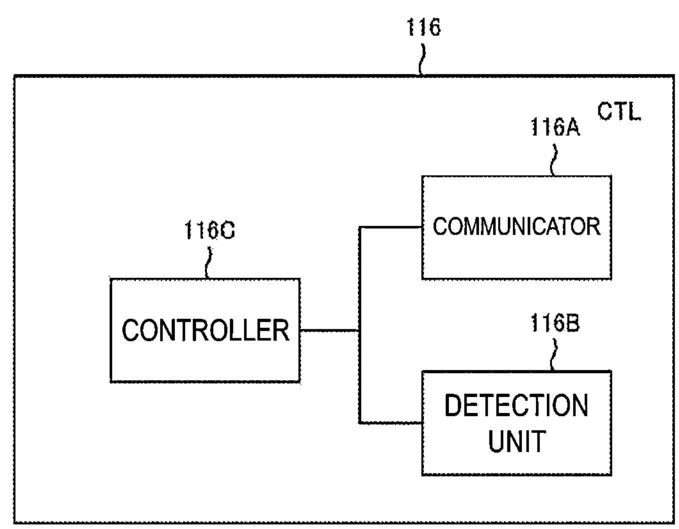
FIG. 4 is a diagram illustrating a control device 116 according to the first embodiment.

A control device 116 according to the first embodiment will be described below. As illustrated in FIG. 4, the control device 116 includes a communicator 116A, a detection unit 116B, and a controller 116C.

The communicator 116A includes a communication module. The communication module may be a wireless communication module compliant with standards such as IEEE 802.11a/b/g/n, ZigBee, Wi-SUN, LTE, 5G, and the like, or may be a wired communication module compliant with standards such as IEEE 802.3.

In the first embodiment, the communicator 116A has a function of executing communication with the power supply unit 200. The communicator 116A receives communication information from the power supply unit 200. For example, the communication information includes information indicating available output capacities of the distributed power supplies 210.

The available output capacities are capacities that can be output by the distributed power supplies 210 per unit time. For example, in a case where a distributed power supply 210 is the solar cell device 210A, the available output capacity of the solar cell device 210A may be determined by the output power that changes from moment to moment. In a case where a distributed power supply 210 is the power storage device 210B, the available output capacity of the power storage device 210B may be determined by the maximum output power of the power storage device 210B, or may be determined by rated output power of the power storage device 210B.

The detection unit 116B detects various states. For example, the detection unit 116B may detect whether the power supply unit 200 is mounted in the coupling device 100. Whether the power supply unit 200 is mounted may be detected by a signal received from a sensor provided in the housing bay 120.

The controller 116C may include at least one processor. The at least one processor may be configured of a single integrated circuit (IC) or a plurality of circuits (such as integrated circuits and/or discrete circuits) connected so as to be capable of communicating with each other.

In the first embodiment, the controller 116C controls the power conversion device 110 based on the communication information received from the power supply unit 200. For example, the communication information is the information received from the power supply unit 200 connected to the coupling device 100, and includes the information indicating the available output capacities of the distributed power supplies 210. The controller 116C controls the maximum output capacity of the electrical power interfaces 115 based on the available output capacities of the distributed power supplies 210.

For example, in a case where two distributed power supplies 210 each having an available output capacity of 1.0 kWh are connected to the power conversion device 110, the controller 116C may control the maximum output capacity of the electrical power interfaces 115 to be an output capacity obtained by multiplying 2.0 kWh by a coefficient. The coefficient may be a value that can be arbitrarily set from 0 to 1.0.

Here, the output capacity of the electrical power interfaces 115 follows the power consumption of load equipment of the electrical power systems 310 connected to the electrical power interfaces 115. Accordingly, the controller 116C causes the output capacity of the electrical power interfaces 115 to follow the power consumption of the load equipment, under the condition that the power consumption of the load equipment does not exceed the maximum output capacity. In a case where the power consumption of the load equipment exceeds the maximum output capacity, the controller 116C maintains the output capacity of the electrical power interfaces 115 at the maximum output capacity.

In the first embodiment, in a case where the number of power supply units 200 connected to the coupling device 100 is two or more, the controller 116C may output alternating current power from an electrical power interface 115 selected from among two or more electrical power interfaces 115.

For example, in a case where the number of power supply units 200 connected to the coupling device 100 is one, single-phase three-wire 200 V power cannot be generated by the converter 112, but in a case where the number of the power supply units 200 connected to the coupling device 100 is two or more, single-phase three-wire 200 V power can be generated by the converter 112. Accordingly, in a case where the number of power supply units 200 connected to the coupling device 100 is two or more, it is possible to select either the electrical power interface 115A (single-phase two-wire 100 V) or the electrical power interface 115B (single-phase three-wire 200 V). The controller 116C switches the electrical power interfaces 115 by switching of the switching unit 114. The electrical power interfaces 115 may be optionally selected by a user, or may be automatically selected by the connection state of the electrical power systems 310 to the electrical power interfaces 140.

Control Device

Figure 5:
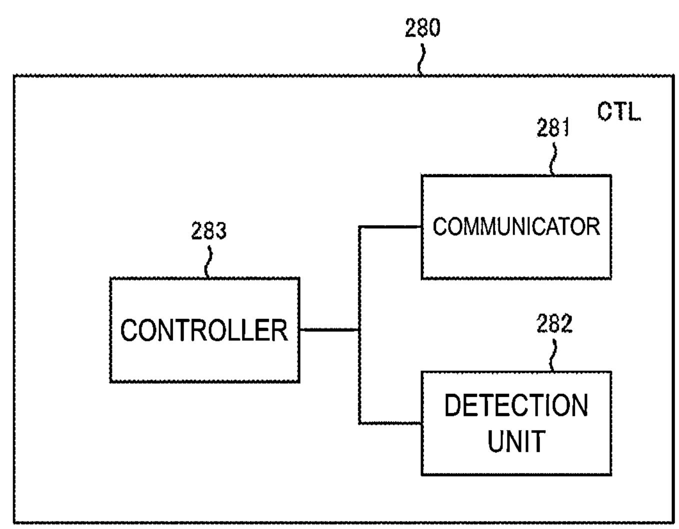
FIG. 5 is a diagram illustrating a control device 280 according to the first embodiment.

The control device 280 according to the first embodiment will be described below. As illustrated in FIG. 5, the control device 280 includes a communicator 281, a detection unit 282, and a controller 283.

The communicator 281 includes a communication module. The communication module may be a wireless communication module compliant with standards such as IEEE 802.11a/b/g/n, ZigBee, Wi-SUN, LTE, 5G, and the like, or may be a wired communication module compliant with standards such as IEEE 802.3.

In the first embodiment, the communicator 281 has a function of executing communication with the power conversion device 110. The communicator 281 transmits communication information from the power supply unit 200. For example, the communication information includes information indicating the available output capacities of the distributed power supplies 210.

The detection unit 282 detects various states. For example, the detection unit 282 may detect whether the power supply unit 200 is mounted in the coupling device 100. Whether the power supply unit 200 is mounted may be detected by the signal received from the sensor provided in the housing bay 120. In a case where the detection unit 282 detects that the power supply unit 200 is mounted, the communicator 281 described above may transmit to the power conversion device 110 information that the power supply unit 200 is mounted.

The controller 283 may include at least one processor. The at least one processor may be configured of a single integrated circuit (IC) or a plurality of circuits (such as integrated circuits and/or discrete circuits) connected so as to be capable of communicating with each other.

In the first embodiment, the controller 283 controls the power supply unit 200 based on communication information received from the power conversion device 110. For example, the communication information may include information specifying the output capacities of the distributed power supplies 210. The controller 283 controls the output capacities of the distributed power supplies 210 to be the output capacity specified by the power conversion device 110.

Here, a case will be considered in which the solar cell device 210A and the power storage device 210B coexist. In a case where the available output capacity of the solar cell device 210A is smaller than the output capacity specified by the power conversion device 110, the controller 283 may control the power storage device 210B so as to discharge from the power storage device 210B power corresponding to the difference between these capacities. In a case where the available output capacity of the solar cell device 210A is larger than the output capacity specified by the power conversion device 110, the controller 283 may control the power storage device 210B so as to charge the power storage device 210B with power corresponding to the difference between these capacities.

Control Method

The control method according to the first embodiment will be described below. Although one power supply unit 200 is illustrated here, in practice, two or more power supply units 200 may be connected to the power conversion device 110.

Figure 6:
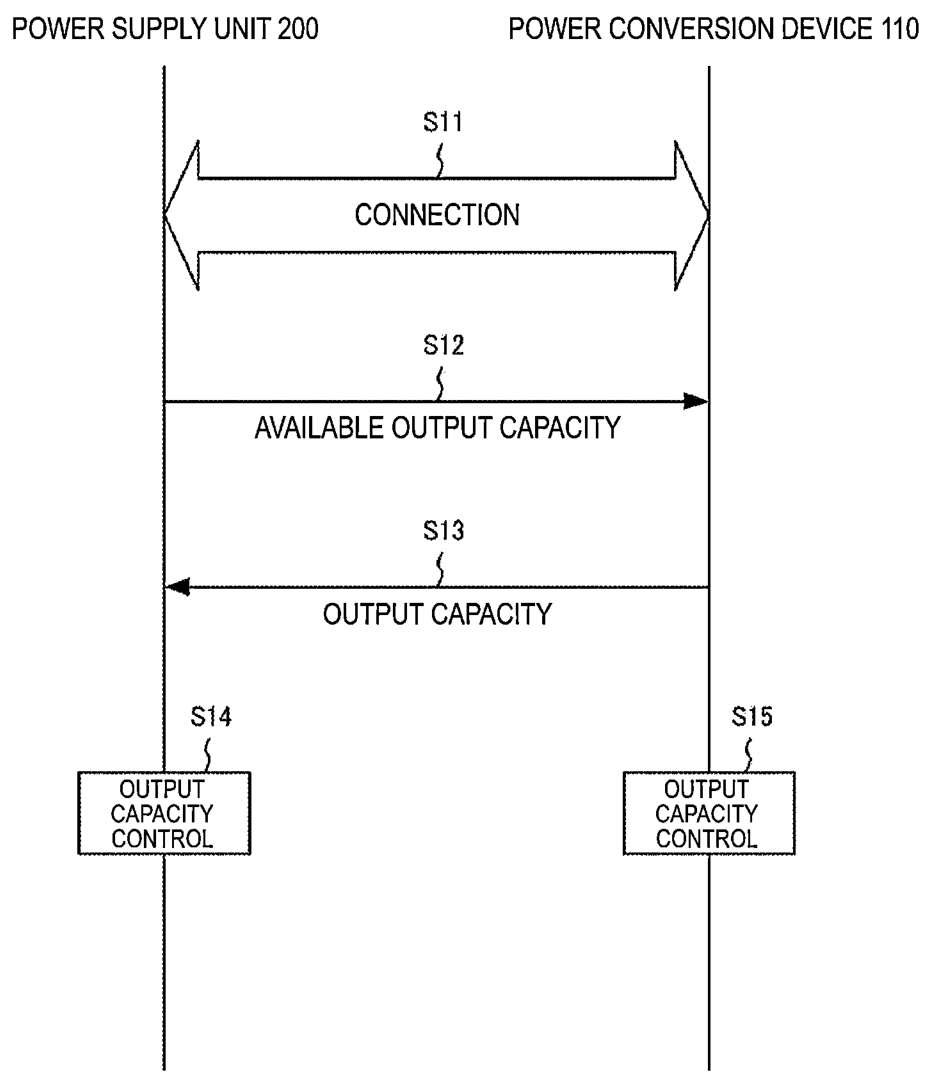
FIG. 6 is a diagram illustrating a control method according to the first embodiment.

As illustrated in FIG. 6, in step S11, the power supply unit 200 is connected to the power conversion device 110. In other words, after the power supply unit 200 is housed in the housing bay 120, the switching unit 130 is switched to ON.

In step S12, the power supply unit 200 transmits information indicating the available output capacity to the power conversion device 110.

In step S13, the power conversion device 110 transmits information specifying the output capacities of the distributed power supplies 210 to the power supply unit 200.

In step S14, the power supply unit 200 controls the output capacities of the distributed power supplies 210 to be the output capacity specified by the power conversion device 110.

In step S15, the power conversion device 110 controls the maximum output capacity of the electrical power interfaces 115 based on the available output capacities of the distributed power supplies 210 provided in the power supply unit 200 connected to the power conversion device 110.

Although step S13 and step S14 are illustrated in FIG. 6, in a case where the output capacities of the distributed power supplies 210 are interlocked with the output capacities of the electrical power interfaces 115, these steps may be omitted.

Actions and Effects

In the first embodiment, the power supply unit 200 can be used in the state of being detached from the coupling device 100. In other words, the power supply unit 200 can be used as the emergency power supply. The power supply unit 200 can also be used in a state of being mounted in the coupling device 100. In other words, the power supply unit 200 can be used at a normal time other than an emergency time. In such a case, since the power supply unit 200 and the power conversion device 110 are DC-link-connected to each other, the conversion loss between the direct current and the alternating current can be suppressed. As described above, the usage scenarios of the power supply unit 200 can be expanded.

In the first embodiment, the power conversion device 110 obtains the available output capacities of the distributed power supplies 210 provided in the power supply unit 200 connected to the power conversion device 110 as the communication information, and controls the maximum output capacity of the electrical power interfaces 115 based on the available output capacities of the distributed power supplies 210. According to such a configuration, even in a case where various power supply units 200 are connected to the power conversion device 110, the maximum output capacity of the electrical power interfaces 115 can be appropriately controlled.

Variation 1

Variation 1 of the first embodiment will be described below. In the following, differences from the first embodiment will be mainly described.

In the Variation 1, the controller 116C of the power conversion device 110 may select an electrical power interface that outputs alternating current power from among two or more electrical power interfaces based on the available output capacities of the distributed power supplies 210.

For example, in a case where the available output capacities of the distributed power supplies 210 provided in the power supply unit 200 connected to the coupling device 100 is a threshold value or greater, the controller 116C may select the electrical power interface 115B (single-phase three-wire 200V). In a case where the available output capacities of the distributed power supplies 210 provided in the power supply unit 200 connected to the coupling device 100 is smaller than the threshold value, the controller 116C may select the electrical power interface 115A (the single-phase two-wire 100V).

Here, the priority of the load equipment of the electrical power system 310A connected to the electrical power interface 115A (single-phase two-wire 100 V) may be higher than the priority of the load equipment of the electrical power system 310B connected to the electrical power interface 115B (single-phase three-wire 200 V). The selection described above may be executed when a power failure occurs in an area where the coupling device 100 is provided.

Actions and Effects

In the Variation 1, the power conversion device 110 selects an electrical power interface for outputting alternating current power from among two or more electrical power interfaces based on the available output capacities of the distributed power supplies 210. According to such a configuration, electrical power can be supplied to desired load equipment selected from among the load equipment connected to the power conversion device 110.

Variation 2

A Variation 2 of the first embodiment will be described below. In the following, differences from the first embodiment will be mainly described.

In the Variation 2, a procedure for executing adjustment (calibration) of a voltage of the first electrical power interface 250 will be described. Specifically, each power supply unit 200 may be used in a state of being detached from the coupling device 100, and thus an error may occur between the voltage of the direct current power ascertained by each power supply unit 200 and the voltage of the direct current power ascertained by the power conversion device 110. Accordingly, it may be necessary to adjust the voltage of the first electrical power interface 250.

Figure 7:
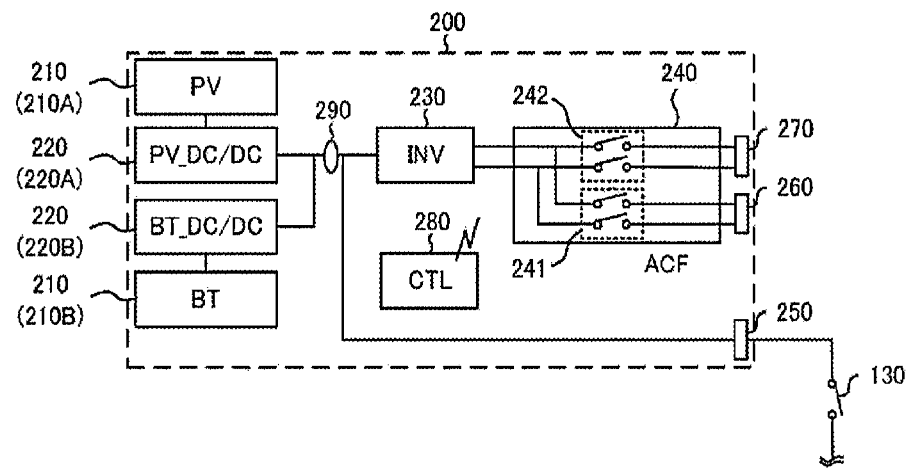
FIG. 7 is a diagram illustrating a power conversion device 110 and a power supply unit 200 according to a Variation 2 of the first embodiment.
Figure 7:
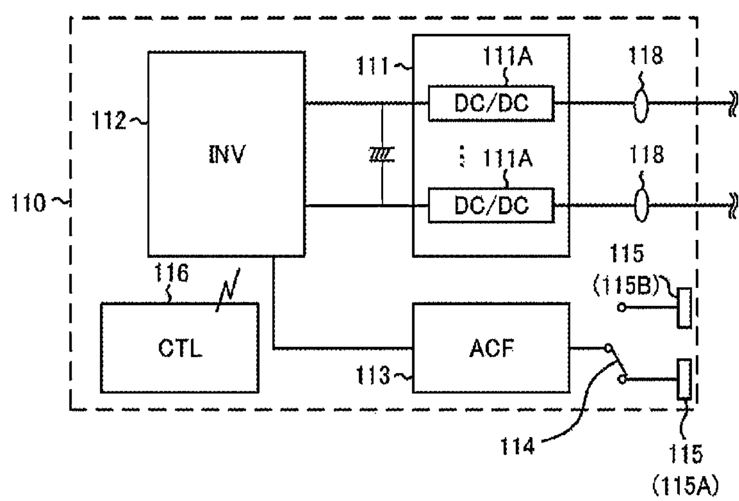

As illustrated in FIG. 7, the power supply unit 200 includes a detection unit 290 that detects the voltage of the first electrical power interface 250. The detection unit 290 is provided at a position where a voltage of a power line between the first electrical power interface 250 and the distributed power supplies 210 can be detected. The power conversion device 110 includes detection units 118 for detecting a voltage of direct current power input to the power conversion device 110.

Under such a premise, the communication information includes information indicating a reference voltage used in the first electrical power interface 250. As the reference voltage, a voltage detected by a corresponding one of the detection units 118 in a state where the power supply system 10 is stably operated may be used. The controller 283 of the power supply unit 200 adjusts the voltage of the first electrical power interface 250, assuming that the voltage detected by the detection unit 290 is equal to the reference voltage. In other words, the adjustment of the voltage detected by the detection unit 290 is executed.

Control Method

A control method according to the Variation 2 will be described below. Although one power supply unit 200 is illustrated here, in practice, two or more power supply units 200 may be connected to the power conversion device 110.

Figure 8:
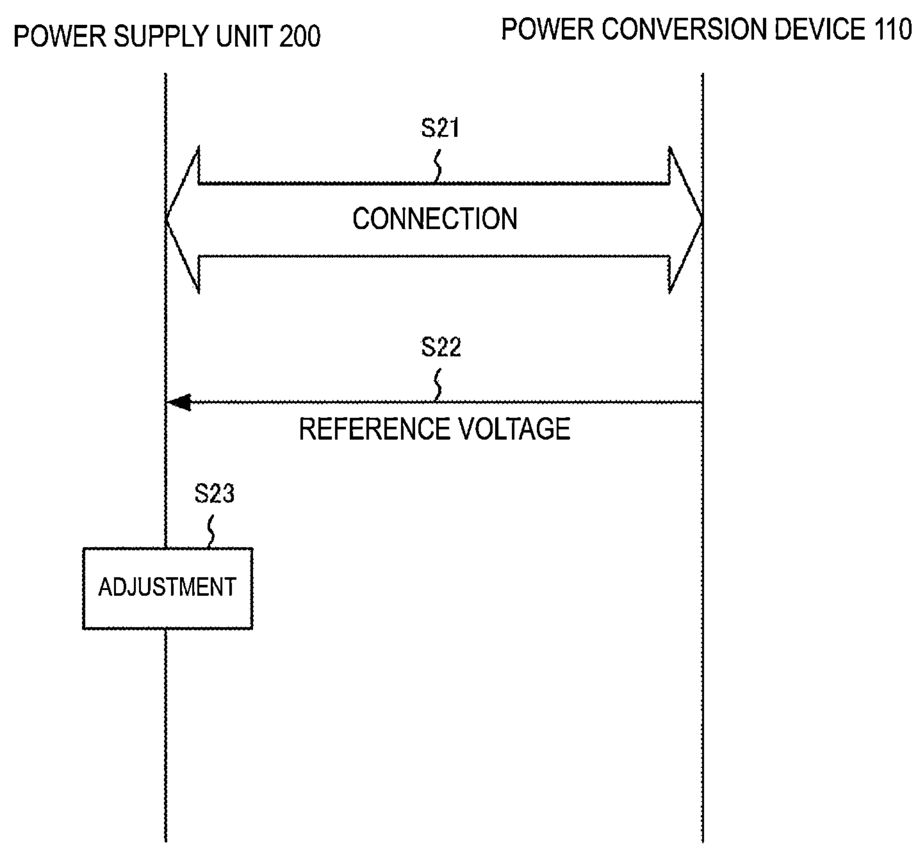
FIG. 8 is a diagram illustrating a control method according to the Variation 2 of the first embodiment.

As illustrated in FIG. 8, in step S21, the power supply unit 200 is connected to the power conversion device 110. In other words, after the power supply unit 200 is housed in the housing bay 120, the switching unit 130 is switched to ON.

In step S22, the power conversion device 110 transmits information indicating the reference voltage to the power supply unit 200.

In step S23, the power supply unit 200 adjusts the voltage of the first electrical power interface 250 based on the reference voltage. The power supply unit 200 adjusts the voltage of the first electrical power interface 250, assuming that the voltage detected by the detection unit 290 is equal to the reference voltage.

In the Variation 2, a case is illustrated in which the reference voltage is the voltage of the direct current power input to the power conversion device 110. However, the Variation 2 is not limited this example. Specifically, the reference voltage may be a representative value of the direct current power used in the power supply system 10. Accordingly, the reference voltage may be a maximum value, a minimum value, an average value, a median value, or the like of the direct current power of the power supply unit 200 connected to the coupling device 100.

In the Variation 2, a case is illustrated in which information indicating the reference voltage is transmitted from the power conversion device 110 to the power supply unit 200. However, the Variation 2 is not limited this example. Specifically, information indicating the reference voltage may be transmitted from a master node selected from among the power conversion device 110 and the power supply unit 200 to another slave node. In such a configuration, it is also possible to execute adjustment of the voltage in the power supply system 10.

Actions and Effects

In the Variation 2 the power supply unit 200 obtains the reference voltage as communication information, and adjusts the voltage of the first electrical power interface 250 based on the reference voltage. According to such a configuration, even in the case where various power supply units 200 are connected to the power conversion device 110, the voltage in the power supply system 10 can be appropriately equalized.

Variation 3

A Variation 3 of the first embodiment will be described below. In the following, differences from the first embodiment will be mainly described.

In the Variation 3, communication information is information transmitted to the power conversion device 110 from the power supply unit 200 connected to the coupling device 100, and includes information indicating the degrees of deterioration of the distributed power supplies 210. The controller 116C of the power conversion device 110 controls the connection relationship between the power supply unit 200 and the power conversion device 110 based on the degrees of deterioration of the distributed power supplies 210. Control of the connection relationship can be controlled by ON/OFF of the switching unit 130 described above. Here, the degree of deterioration is a parameter meaning that the higher the degree of deterioration, the more the deterioration progresses.

For example, the controller 116C controls the connection relationship such that a distributed power supply 210 with a degree of deterioration exceeding a threshold value is not connected to the power conversion device 110. The controller 116C may control the connection relationship such that the distributed power supplies 210 are not connected to the power conversion device 110 in descending order of degree of deterioration, under the condition that the power consumption of the load equipment of the electrical power systems 310 is ensured. In other words, the controller 116C may control the connection relationship such that the distributed power supplies 210 are connected to the power conversion device 110 in ascending order of degree of deterioration in order to follow the power consumption of the load equipment of the electrical power systems 310.

Alternatively, the priority for connecting the distributed power supplies 210 to the power conversion device 110 may be set to the distributed power supplies 210. The priority is a parameter in which the lower the degree of deterioration, the higher the value set. In such a case, the controller 116C may control the connection relationship such that the distributed power supplies 210 are connected to the power conversion device 110 in descending order of priority, under the condition that the power consumption of the load equipment of the electrical power systems 310 is ensured.

Here, in a case where the power supply unit 200 includes two or more distributed power supplies 210, the degrees of deterioration of the distributed power supplies 210 may be read as the degree of deterioration of the power supply unit 200. The degree of deterioration of the power supply unit 200 may be a representative value of the degrees of deterioration of the two or more distributed power supplies 210 included in the power supply unit 200, and may be a maximum value, a minimum value, an average value, or a median value of the degrees of deterioration. In a case where types of the two or more distributed power supplies 210 are different from each other, the degrees of deterioration may be values normalized so that the distributed power supplies 210 of the different types can be compared with each other.

In a case where a distributed power supply 210 is the solar cell device 210A, the degree of deterioration of the solar cell device 210A may be identified by the time elapsed since the solar cell device 210A is installed. In a case where a distributed power supply 210 is the power storage device 210B, the degree of deterioration of the power storage device 210B may be identified by the cumulative number of charges and discharges of the power storage device 210B.

Control Method

A control method according to the Variation 3 will be described below. Although one power supply unit 200 is illustrated here, in practice, two or more power supply units 200 are connected to the power conversion device 110.

Figure 9:
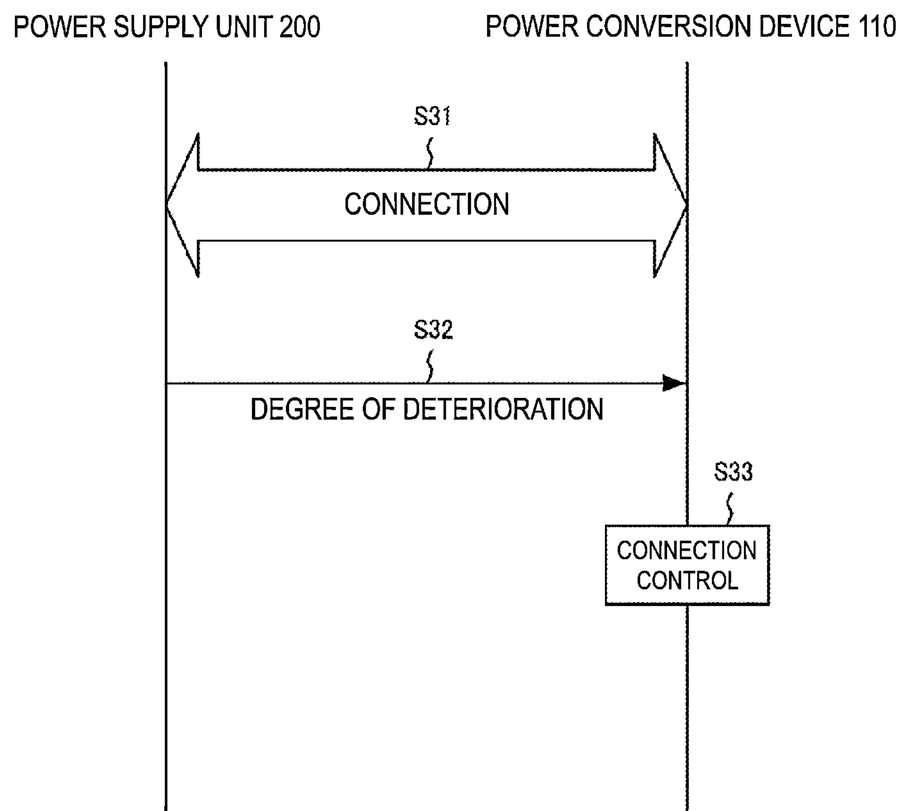
FIG. 9 is a diagram illustrating a control method according to a Variation 3 of the first embodiment.

As illustrated in FIG. 9, in step S31, the power supply unit 200 is connected to the power conversion device 110. In other words, after the power supply unit 200 is housed in the housing bay 120, the switching unit 130 is switched to ON.

In step S32, the power supply unit 200 transmits information indicating the degree of deterioration to the power conversion device 110.

In step S33, the power conversion device 110 controls the connection relationship between the power supply unit 200 and the power conversion device 110 based on the degrees of deterioration of the distributed power supplies 210. Control of the connection relationship is as described above.

Actions and Effects

In the Variation 3, the power conversion device 110 obtains the degrees of deterioration of the distributed power supplies 210 as communication information, and controls the connection relationship between the power supply unit 200 and the power conversion device 110 based on the degrees of deterioration of the distributed power supplies 210. According to such a configuration, it is possible to suppress variation in the life of the distributed power supplies 210 of the power supply unit 200 that can be mounted in the coupling device 100.

Variation 4

A Variation 4 of the first embodiment will be described below. In the following, differences from the first embodiment will be mainly described.

In the Variation 4, the communication information is information transmitted to the power conversion device 110 from the power supply unit 200 connected to the coupling device 100, and includes a remaining power storage level of the power storage device 210B. The controller 116C of the power conversion device 110 controls at least one of charging or discharging of the power storage device 210B based on the remaining power storage level of the power storage device 210B.

Here, a case will be described in which the remaining power storage level to be secured by the power storage device 210B (hereinafter, remaining secured level) is determined in a state where the power supply unit 200 is detached from the coupling device 100. For example, in the Variation 4, a case is assumed in which the power supply unit 200 is used as an emergency power supply in a state of being detached from the coupling device 100. The controller 116C controls at least one of charging or discharging of the power storage device 210B based on the remaining secured level.

Discharging of Power Storage Device

Figure 10:
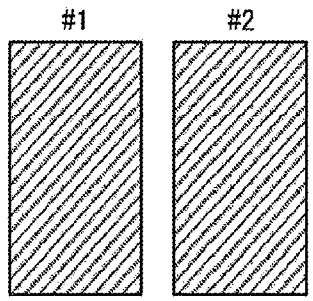
FIG. 10 is a diagram illustrating discharge of a power storage device 210B according to a Variation 4 of the first embodiment.
Figure 10:
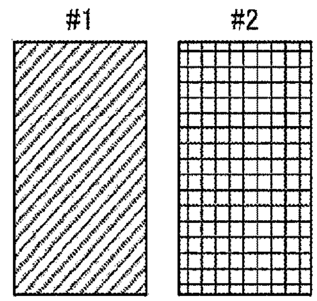
Figure 10:
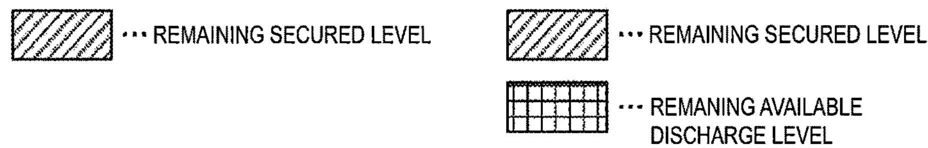
Figure 10:
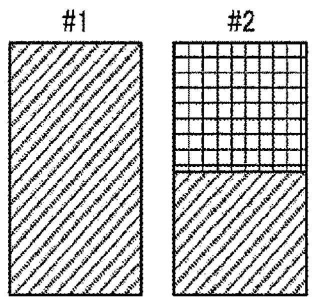
Figure 10:
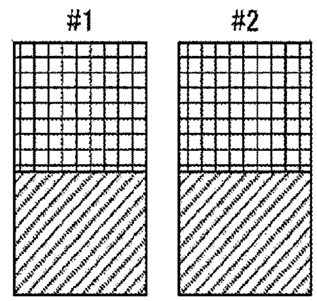
Figure 10:
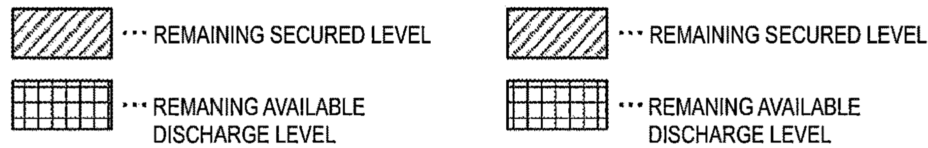
Figure 10:
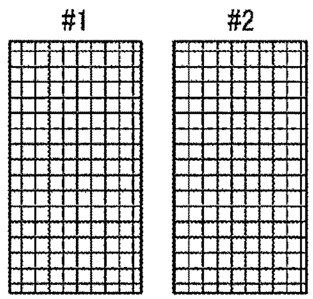

The discharging of the power storage device 210B will be described below. Here, patterns 1 to 5 are illustrated as patterns of the remaining secured level in a case where the remaining power storage levels of the power storage devices #1 and #2 are provided. In FIG. 10, a case is illustrated in which the remaining power storage levels of the power storage device #1 and the power storage device #2 are maximum (fully charged state).

In the pattern 1, the remaining secured level is the entirety of a power storage capacity of the power storage device #1 and the entirety of a power storage capacity of the power storage device #2. Accordingly, in the pattern 1, the power conversion device 110 limits discharging of the power storage device #1 and the power storage device #2 in a state where the power storage device #1 and the power storage device #2 are connected to the coupling device 100. In other words, there is no available discharge capacity.

In the pattern 2, the remaining secured level is the entirety of the power storage capacity of the power storage device #1. Accordingly, in the pattern 2, the power conversion device 110 allows discharging of the power storage device #2 but limits discharging of the power storage device #1 in the state where the power storage device #1 and the power storage device #2 are connected to the coupling device 100. In other words, the available discharge capacity is the entirety of the power storage capacity of the power storage device #2.

In the pattern 3, the remaining secured level is the entirety of the power storage capacity of the power storage device #1 and a part of the power storage capacity of the power storage device #2. Accordingly, in the pattern 3, the power conversion device 110 allows discharging of the power storage device #2 under the condition of not falling below the secured capacity of the power storage device #2 and limits discharging of the power storage device #1 in the state where the power storage device #1 and the power storage device #2 are connected to the coupling device 100. In other words, the available discharge capacity is a capacity other than the secured capacity of the power storage device #2.

In the pattern 4, the remaining secured level is a part of the power storage capacity of the power storage device #1 and a part of the power storage capacity of the power storage device #2. Accordingly, in the pattern 4, the power conversion device 110 allows discharging of the power storage device #1 under condition of not falling below the secured capacity of the power storage device #1 and allows discharging of the power storage device #2 under the condition of not falling below the secured capacity of the power storage device #2 in the state where the power storage device #1 and the power storage device #2 are connected to the coupling device 100. In other words, the available discharge capacity is a capacity other than the secured capacity of the power storage device #1 and a capacity other than the secured capacity of the power storage device #2.

In the pattern 5, there is no remaining secured level. Accordingly, in the pattern 5, the power conversion device 110 does not limit discharging of the power storage device #1 and the power storage device #2 in the state where the power storage device #1 and the power storage device #2 are connected to the coupling device 100. In other words, the available discharge capacity is the entirety of the power storage capacity of the power storage device #1 and the entirety of the power storage capacity of the power storage device #2.

Charging of Power Storage Device

The charging of the power storage device 210B will be described below. Here, the above-described pattern 2 and pattern 3 will be illustrated.

Firstly, in a case where the remaining secured level is the pattern 2, a case will be considered in which, the power storage device #1 and the power storage device #2 are used in a state of being detached from the coupling device 100, and are reconnected to the coupling device 100 in a state where there is no remaining power storage level of the power storage device #1 and the power storage device #2.

Figure 11:
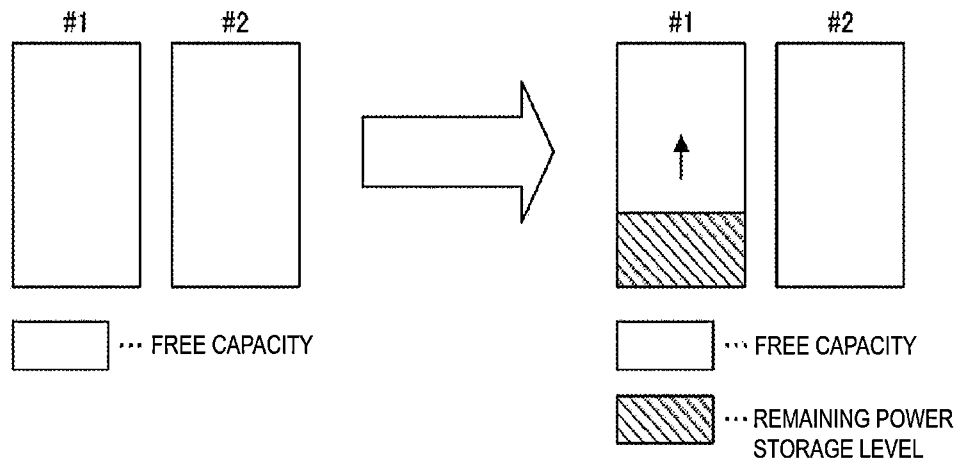
FIG. 11 is a diagram illustrating discharge of the power storage device 210B according to the Variation 4 of the first embodiment.
Figure 11:
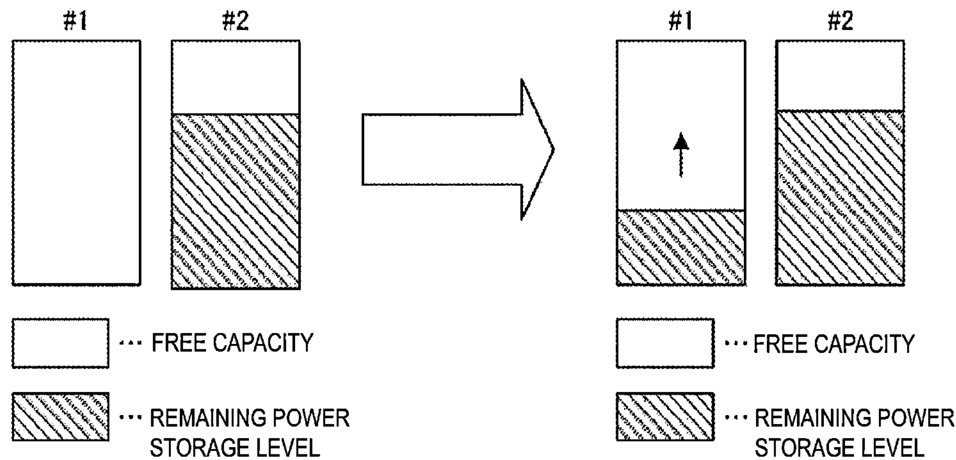

As described above, in the pattern 2, the remaining secured level is the entirety of the power storage capacity of the power storage device #1. Accordingly, as illustrated in the upper part of FIG. 11, the power conversion device 110 preferentially executes charging of the power storage device #1 rather than charging of the power storage device #2 in the state where the power storage device #1 and the power storage device #2 are connected to the coupling device 100.

Secondly, in a case where the remaining secured level is the pattern 3, a case will be considered in which, the power storage device #1 and the power storage device #2 are used in the state of being detached from the coupling device 100, and are reconnected to the coupling device 100 in a state where there is no remaining power storage level of the power storage device #1 and the remaining power storage level of the power storage device #2 exceeds the remaining secured level.

As described above, in the pattern 3, the remaining secured level is the entirety of the power storage capacity of the power storage device #1 and a part of the power storage capacity of the power storage device #2. Note that, the remaining power storage level of the power storage device #2 exceeds the remaining secured level. Accordingly, as illustrated in the lower part of FIG. 11, the power conversion device 110 preferentially executes charging of the power storage device #1 rather than charging of the power storage device #2 in the state where the power storage device #1 and the power storage device #2 are connected to the coupling device 100.

Note that, in the pattern 1 or the pattern 5 described above, since there is no difference between the remaining secured levels of the power storage device #1 and the power storage device #2, the power conversion device 110 may simultaneously execute charging of the power storage device #1 and the power storage device #2 in the state where the power storage device #1 and the power storage device #2 are connected to the coupling device 100. In the pattern 3 or the pattern 4 described above, the power conversion device 110 may stop charging of the power storage device in which the remaining power storage level has reached the remaining secured level and may continue charging of the power storage device in which the remaining power storage level has not been reached the remaining secured level in the state where the power storage device #1 and the power storage device #2 are connected to the coupling device 100.

In this way, the power conversion device 110 may control charging of the power storage device so that the remaining power storage level of each of the power storage devices reaches the remaining secured level in the shortest possible time.

Control Method

A control method according to the Variation 4 will be described below. Although one power supply unit 200 is illustrated here, in practice, two or more power supply units 200 may be connected to the power conversion device 110.

Figure 12:
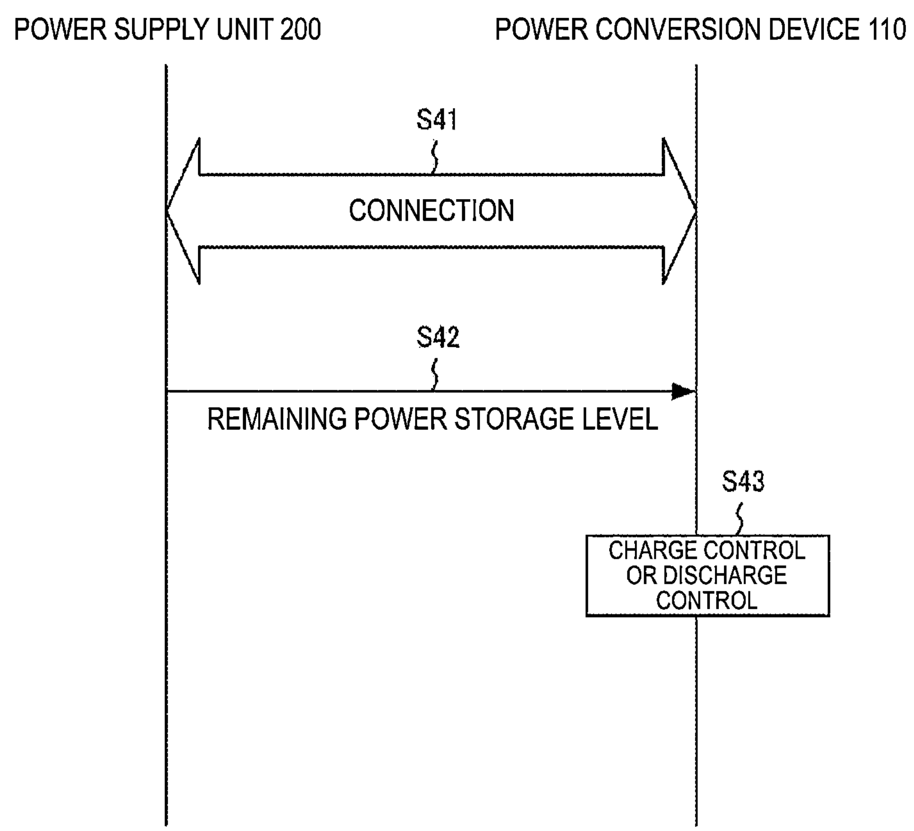
FIG. 12 is a diagram illustrating a control method according to the Variation 4 of the first embodiment.

As illustrated in FIG. 12, in step S41, the power supply unit 200 is connected to the power conversion device 110. In other words, after the power supply unit 200 is housed in the housing bay 120, the switching unit 130 is switched to ON.

In step S42, the power supply unit 200 transmits information indicating the remaining power storage level of the power storage device 210B to the power conversion device 110.

In step S43, the power conversion device 110 controls at least one of charging or discharging of the power storage device 210B based on the remaining power storage level of the power storage device 210B. For example, the power conversion device 110 controls discharging of the power storage device 210B under the condition that the remaining secured level is ensured. The power conversion device 110 controls charging of the power storage device 210B so that the remaining secured level is ensured in the shortest possible time.

Actions and Effects

In the Variation 4, the power conversion device 110 obtains the remaining power storage level of the power storage device 210B as the communication information, and controls at least one of charging or discharging of the power storage device 210B based on the remaining power storage level of the power storage device 210B. According to such a configuration, even in a case where the remaining secured level is determined for the power storage device 210B, charging and discharging of the power storage device 210B can be appropriately controlled.

Variation 5

A Variation 5 of the first embodiment will be described below. In the following, differences from the first embodiment will be mainly described. In the Variation 5, the power supply system 10 may report various information.

For example, in a case where the communication information includes information indicating the available output capacity, the power supply system 10 may report the maximum output capacity of the power conversion device 110.

In a case where the communication information includes information indicating the degree of deterioration, the power supply system 10 may report the degrees of deterioration of the distributed power supplies 210. The power supply system 10 may report the priority of the distributed power supplies 210. As described in the Variation 3, the priority is determined based on the degree of deterioration.

In a case where the communication information includes the remaining power storage level, the power supply system 10 may report the remaining power storage level of the power storage device 210B. The power supply system 10 may report the available discharge capacity of the power storage device 210B. The available discharge capacity can be identified by the remaining power storage level and the remaining secured level.

These reports may be executed by the power conversion device 110, may be executed by a terminal capable of communicating with the power conversion device 110, and may be executed by the display unit 100X.

Second Embodiment

A second embodiment will be described below. In the following, differences from the first embodiment described above will be mainly described.

First Predetermined Control

A first predetermined control according to the second embodiment will be described below. Here, for the sake of simplicity of explanation, a case will be illustrated in which the output power of the power conversion device 110 is constant. For example, the case where the output power of the power conversion device 110 is constant is a case where the output power of the power conversion device 110 is the maximum output capacity. Note that, the output power of the power conversion device 110 may follow the power consumption of the load equipment of the electrical power systems 310 connected to the electrical power interfaces 115.

Figure 13:
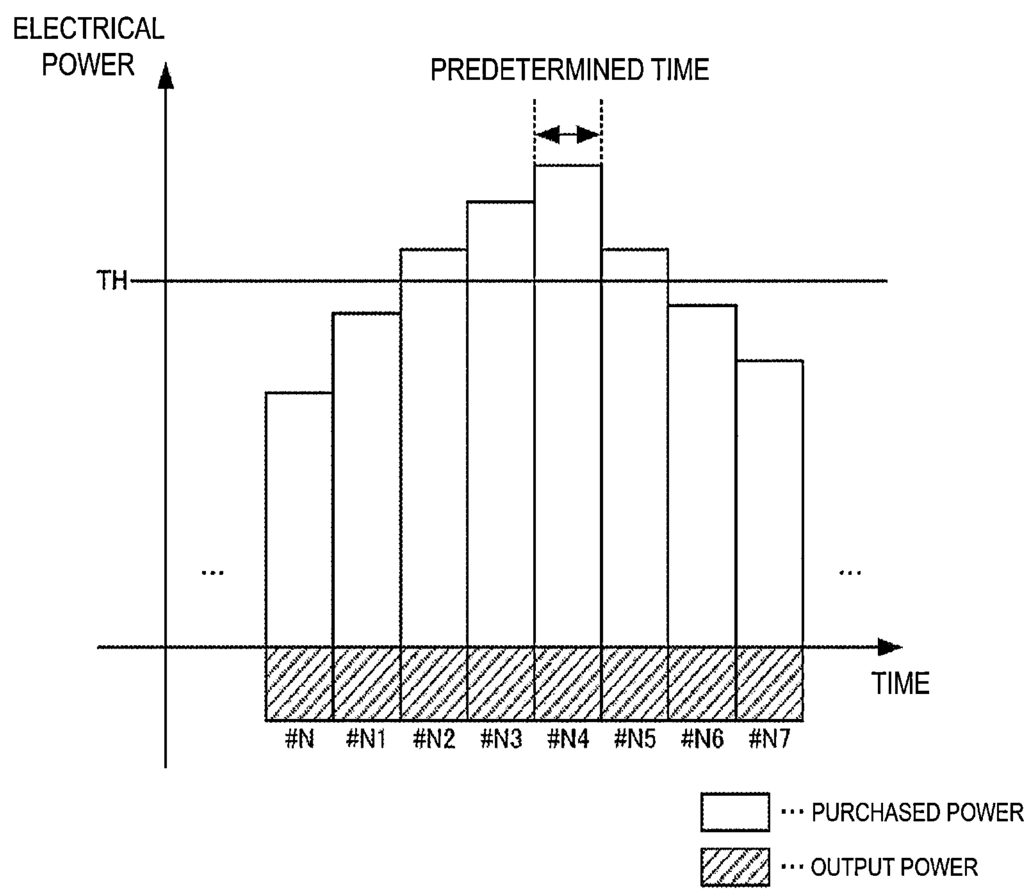
FIG. 13 is a diagram for illustrating a first predetermined control according to a second embodiment.

As illustrated in FIG. 13, since the power consumption of the load equipment of the electrical power systems 310 connected to the electrical power interfaces 115 fluctuates, the accumulated power of purchased power also fluctuates every predetermined time, assuming that the output power of the power conversion device 110 is constant. In the case illustrated in FIG. 13, the accumulated power of the purchased power exceeds a predetermined threshold value at the predetermined times # N2 to # N5.

In such a case, the power conversion device 110 reports that the purchased power exceeds the predetermined threshold value at the predetermined times # N2 to # N5. By executing such a report, it is possible to encourage reduction of power consumption of the load equipment of the electrical power systems 310, or to encourage connection of a new power supply unit to the coupling device 100, and thus appropriate peak shaving control can be executed. The reports may be executed by the power conversion device 110, may be executed by a terminal capable of communicating with the power conversion device 110, or may be executed by the display unit 100X.

Second Predetermined Control

A second predetermined control according to the second embodiment will be described below. Here, for the sake of simplicity of explanation, a case will be illustrated in which the output power of the power conversion device 110 is constant, and the power supply units connected to the power conversion device 110 are disconnected. For example, the case where the output power of the power conversion device 110 is constant is a case where the output power of the power conversion device 110 is the maximum output capacity. Note that, the output power of the power conversion device 110 may follow the power consumption of the load equipment of the electrical power systems 310 connected to the electrical power interfaces 115.

Figure 14:
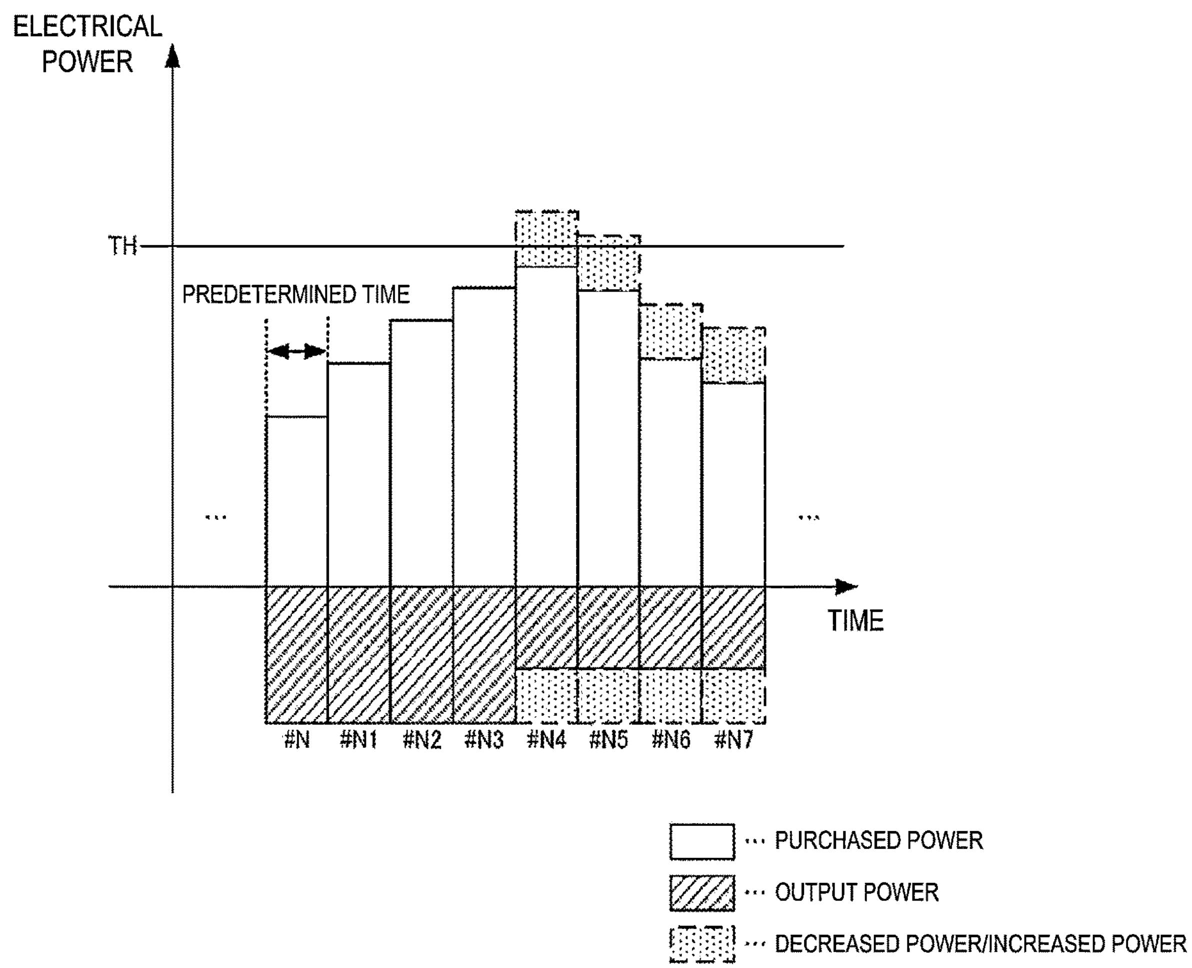
FIG. 14 is a diagram illustrating a second predetermined control according to the second embodiment.

As illustrated in FIG. 14, since the power consumption of the load equipment of the electrical power systems 310 connected to the electrical power interfaces 115 fluctuates, the accumulated power of purchased power also fluctuates every predetermined time, assuming that the output power of the power conversion device 110 is constant. In the case illustrated in FIG. 14, a case is illustrated in which the power supply unit 200 is disconnected at and after the predetermined time # N4. In other words, at and after the predetermined time # N4, the output power of the power conversion device 110 decreases by a decreased power, and the purchased power increases by an increased power. The decreased power is the same as the increased power. In other words, in a case where the power supply unit 200 is disconnected from the coupling device 100, the accumulated power of the purchased power exceeds the predetermined threshold value at the predetermined times # N4 and # N5.

In such a case, the power conversion device 110 executes control for suppressing the disconnection of the power supply unit 200 at the predetermined times # N4 and # N5. By executing such a process, a situation where the accumulated power of the purchased power exceeds the predetermined threshold value can be avoided, and thus appropriate peak shaving control can be executed. The control for suppressing the disconnection of the power supply unit 200 may include a report for suppressing the disconnection of the power supply unit 200, or may include control for suppressing detachment of the power supply unit 200. Suppressions on the detachment may be realized by a mechanism for locking the power supply unit 200 to the coupling device 100.

Control Method

The control method according to the second embodiment will be described below. Although one power supply unit 200 is illustrated here, in practice, two or more power supply units 200 may be connected to the power conversion device 110.

Figure 15:
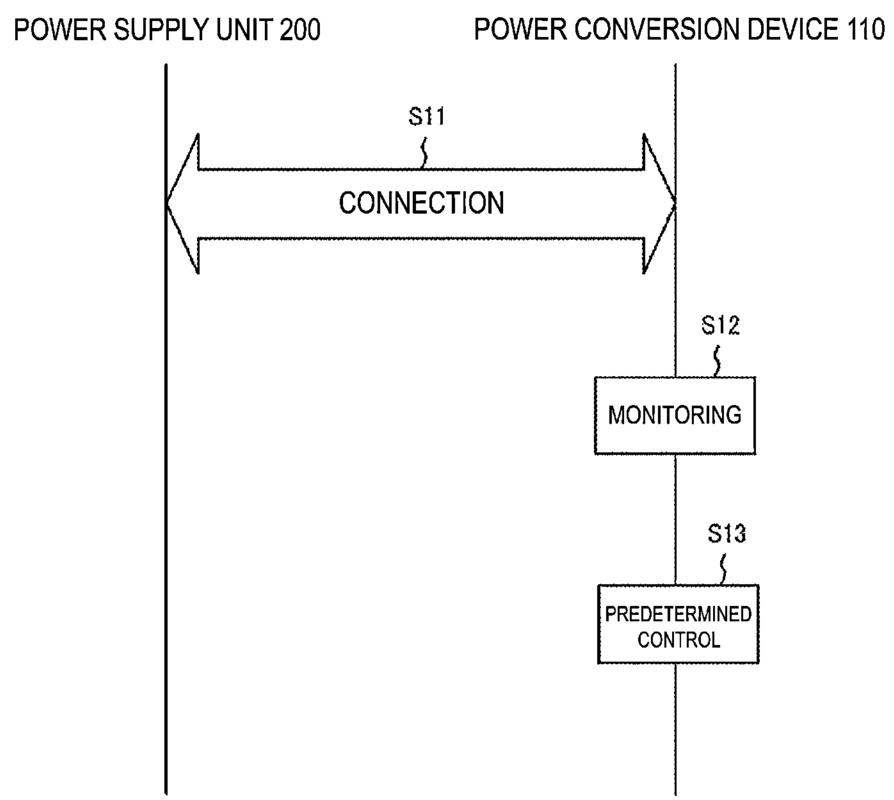
FIG. 15 is a diagram illustrating a control method according to the second embodiment.

As illustrated in FIG. 15, in step S11, the power supply unit 200 is connected to the power conversion device 110. In other words, after the power supply unit 200 is housed in the housing bay 120, the switching unit 130 is switched to ON.

In step S12, the power supply unit 200 monitors the purchased power of a facility provided with the coupling device 100. A method for monitoring the purchased power is as described above.

In step S13, the power conversion device 110 executes predetermined control related to the connection state of the power supply unit 200 to the coupling device 100. The predetermined control may include the above-described first predetermined control, may include the above-described second predetermined control, or may include both the first predetermined control and the second predetermined control.

Actions and Effects

In the second embodiment, the power supply unit 200 can be used in the state of being detached from the coupling device 100. In other words, the power supply unit 200 can be used as an emergency power supply. The power supply unit 200 can also be used in a state of being mounted in the coupling device 100. In other words, the power supply unit 200 can be used at a normal time other than an emergency time. In such a case, since the power supply unit 200 and the power conversion device 110 are DC-link-connected to each other, the conversion loss between the direct current and the alternating current can be suppressed. As described above, the usage scenarios of the power supply unit 200 can be expanded.

In the second embodiment, the power conversion device 110 executes predetermined control related to the connection state of the power supply unit 200 to the coupling device 100. For example, in a case where the purchased power of the facility provided with the coupling device 100 falls below a predetermined threshold value, the predetermined control includes a first predetermined control for reporting that the purchased power exceeds the predetermined threshold value. In a case where the purchased power of the facility provided with the coupling device 100 exceeds a predetermined threshold value when the power supply unit 200 is disconnected from the coupling device 100, the predetermined control includes a second predetermined control for suppressing the disconnection of the power supply unit 200. According to such a configuration, peak shaving control can be appropriately executed.

Variation 1

A Variation 1 of the second embodiment will be described below. In the following, differences from the second embodiment will be mainly described.

In the Variation 1, at least one of the controller 116C of the power conversion device 110 or the controller 283 of the power supply unit 200 switches, as the predetermined control, a position for displaying information of the power supply unit 200 in accordance with the connection state of the power supply unit 200 to the coupling device 100.

For example, in a case where the power supply unit 200 is connected to the coupling device 100, the controller 116C may display the information of the power supply unit 200 connected to the coupling device 100 on the display unit 121. In a case where the power supply unit 200 is housed in the housing bay 120, the controller 116C may display the information of the power supply unit 200 on the display unit 121. On the other hand, in a case where the power supply unit 200 is disconnected from the coupling device 100, the controller 116C may stop the display of the information of the power supply unit 200 connected to the coupling device 100. In a case where the power supply unit 200 is detached from the housing bay 120, the controller 116C may stop the display of the information of the power supply unit 200.

In a case where the power supply unit 200 is disconnected from the coupling device 100, the controller 283 may display the information of the power supply unit 200 disconnected from the coupling device 100 on the display unit 200X. In a case where the power supply unit 200 is detached from the housing bay 120, the controller 283 may display the information of the power supply unit 200 on the display unit 200X. On the other hand, in a case where the power supply unit 200 is connected to the coupling device 100, the controller 283 may stop the display of the information of the power supply unit 200 disconnected from the coupling device 100. In a case where the power supply unit 200 is housed in the housing bay 120, the controller 283 may stop the display of the information of the power supply unit 200.

As described above, the display position of the information of the power supply unit 200 is switched between the display unit 121 and the display unit 200X according to whether the power supply unit 200 is connected to the coupling device 100. In such a case, a display mode of the information of the power supply unit 200 may be switched.

Actions and Effects

In the Variation 1, the predetermined control includes control for switching the position for displaying the information of the power supply unit 200 in accordance with the connection state of the power supply unit 200 to the coupling device 100. According to such a configuration, the information of the power supply unit 200 can be appropriately provided to the user. By stopping unnecessary display, the power consumption associated with the display can be suppressed.

Variation 2

A Variation 2 of the second embodiment will be described below. In the following, differences from the second embodiment will be mainly described.

In the Variation 2, in a case where the start of an operation of disconnecting the power supply unit 200 from the coupling device 100 is detected, at least one of the controller 116C of the power conversion device 110 or the controller 283 of the power supply unit 200 may execute control, as the predetermined control, for suppressing the disconnection of the power supply unit 200 until preparation for disconnecting the power supply unit 200 from the coupling device 100 is completed. For example, the start of the operation of disconnecting the power supply unit 200 may be detected by a button provided in the housing bay 120 being pressed down. For example, the preparation for disconnecting the power supply unit 200 may include a process of confirming whether the decrease in the maximum output capacity of the power conversion device 110 is not problematic. The control for suppressing the disconnection of the power supply unit 200 may include a report for suppressing the disconnection of the power supply unit 200 (for example, display of a string of characters such as "disconnected"), or may include control for suppressing the detachment of the power supply unit 200 (for example, a process of not allowing the switching unit 130 to be OFF). Suppressions on the detachment may be realized by a mechanism for locking the power supply unit 200 to the coupling device 100.

In the Variation 2, in a case where the start of an operation of connecting the power supply unit 200 to the coupling device 100 is detected, at least one of the controller 116C of the power conversion device 110 or the controller 283 of the power supply unit 200 may execute control, as predetermined control, for suppressing connection of the power supply unit 200 until preparation for connecting the power supply unit 200 to the coupling device 100 is completed. For example, the start of the operation of connecting the power supply unit 200 may be detected by a button provided in the housing bay 120 being pressed down. For example, the preparation for connecting the power supply unit 200 may include processes of turning the switching unit 130 ON, confirming the input voltage of the converter 111, confirming the output voltage of the converters 220, confirming whether difference between the input voltage of the converter 111 and the output voltage of the converters 220 is equal to a certain difference or less, making the difference equal to the certain difference or less by controlling the duty ratio of the converter 111, and the like. In a case where the processes are executed on the power conversion device 110 side, the output voltage of the converters 220 may be transmitted from the power supply unit 200 to the power conversion device 110. In a case where the processes are executed on the power supply unit 200 side, the input voltage of the converter 111 may be transmitted from the power conversion device 110 to the power supply unit 200.

The control for suppressing the connection of the power supply unit 200 may include a report for suppressing the connection of the power supply unit 200 (for example, display of a string of characters such as “connected”), or may include control for suppressing the connection of the power supply unit 200 (for example, a process of not allowing the switching unit 130 to be ON).

Control Method

A control method according to the Variation 2 will be described below. Here, one power supply unit 200 to be disconnected or to be connected will be described as an example.

Firstly, an operation of disconnecting the power supply unit 200 from the coupling device 100 will be described.

Figure 16:
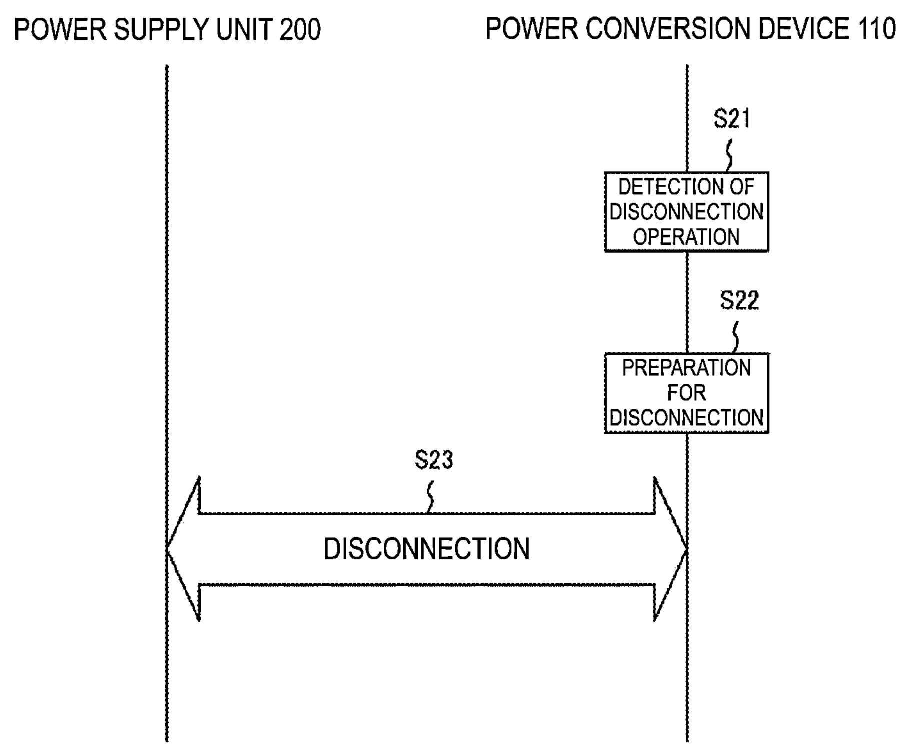
FIG. 16 is a diagram illustrating a control method according to a Variation 2 of the second embodiment.

As illustrated in FIG. 16, in step S21, the power conversion device 110 detects start of the operation of disconnecting the power supply unit 200 from the coupling device 100. The start of the operation of disconnecting the power supply unit 200 may be detected by the button provided in the housing bay 120 being pressed down.

In step S22, the power conversion device 110 executes preparation for disconnecting the power supply unit 200 from the coupling device 100. Here, control for suppressing the disconnection of the power supply unit 200 is executed until the preparation for disconnecting the power supply unit 200 from the coupling device 100 is completed.

In step S23, the power supply unit 200 is disconnected from the coupling device 100.

In FIG. 16, a case is illustrated in which the process is executed on the power conversion device 110 side; however, such a process may be executed on the power supply unit 200 side.

Secondly, an operation of connecting the power supply unit 200 to the coupling device 100 will be described.

Figure 17:
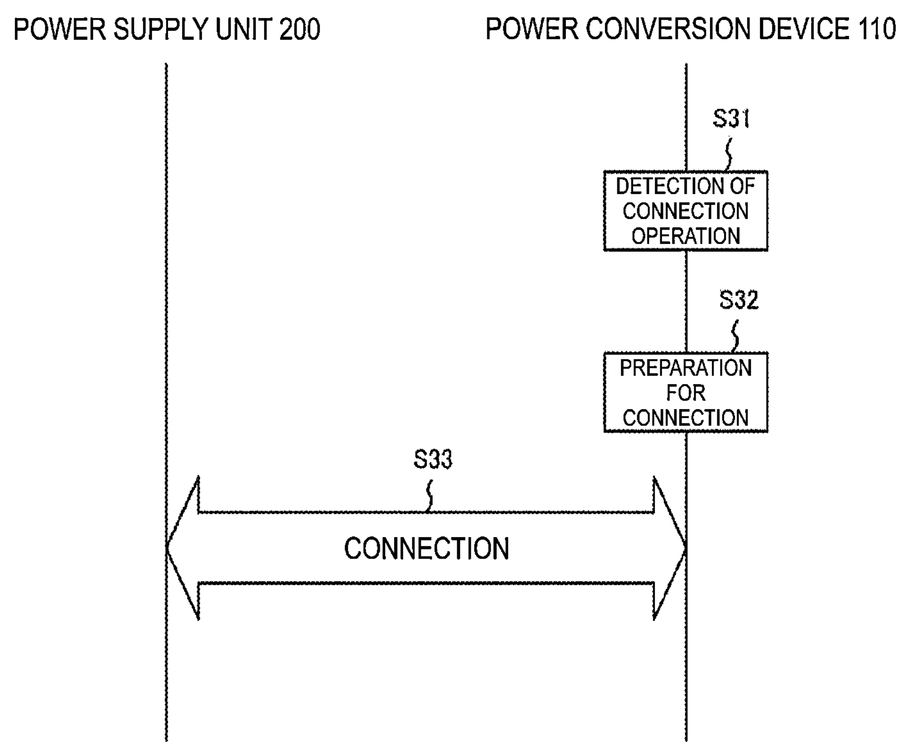
FIG. 17 is a diagram illustrating a control method according to the Variation 2 of the second embodiment.

As illustrated in FIG. 17, in step S31, the power conversion device 110 detects start of the operation of connecting the power supply unit 200 to the coupling device 100. The start of the operation of connecting the power supply unit 200 may be detected by a button provided in the housing bay 120 being pressed down.

In step S32, the power conversion device 110 executes preparation for connecting the power supply unit 200 to the coupling device 100. Here, control for suppressing the connection of the power supply unit 200 is executed until the preparation for connecting the power supply unit 200 to the coupling device 100 is completed.

In step S33, the power supply unit 200 is connected to the coupling device 100.

In FIG. 17, a case is illustrated in which the process is executed on the power conversion device 110 side, but such a process may be executed on the power supply unit 200 side.

Actions and Effects

In the Variation 2, in a case where start of an operation of disconnecting the power supply unit 200 from the coupling device 100 is detected, the predetermined control includes control for suppressing the disconnection of the power supply unit 200 until preparation for disconnecting the power supply unit 200 from the coupling device 100 is completed. In a case where start of the operation of connecting the power supply unit 200 to the coupling device 100 is detected, the predetermined control includes control for suppressing the connection of the power supply unit 200 until preparation for connecting the power supply unit 200 to the coupling device 100 is completed. According to such a configuration, it is possible to suppress a situation or the like in which an unexpected inrush current occurs due to inappropriate connection or disconnection.

Variation 3

A Variation 3 of the second embodiment will be described below. In the following, differences from the second embodiment will be mainly described.

In the Variation 3, at least one of the controller 116C of the power conversion device 110 or the controller 283 of the power supply unit 200 may execute control, as the predetermined control, for suppressing disconnection of one or more predetermined power supply units selected from among the power supply units 200 connected to the coupling device 100. Each predetermined power supply unit may be a power supply unit 200 determined in advance. The predetermined power supply unit may be a power supply unit 200 connected to an individual bay determined in advance from among the individual bays provided in the housing bay 120. The predetermined power supply unit may be a power supply unit 200 set to be managed as an emergency power supply.

The control for suppressing disconnection of the power supply unit 200 may include a report for suppressing the disconnection of the power supply unit 200 (for example, display of a string of characters such as “emergency power supply”), or may include control for suppressing the detachment of the power supply unit 200 (for example, a process of not allowing the switching unit 130 to be OFF). Suppressions of the detachment may be realized by a mechanism for locking the power supply unit 200 to the coupling device 100.

In such a case, in a case where the power supply unit 200 is a power storage unit including the power storage device 210B, at least one of the controller 116C of the power conversion device 110 or the controller 283 of the power supply unit 200 may at least limit, as the predetermined control, the discharge of the power storage device 210B. The power storage device 210B may be the power storage device 210B set to be managed as an emergency power supply.

Actions and Effects

In the Variation 3, the predetermined control includes control for suppressing disconnection of one or more predetermined power supply units selected from among the power supply units 200 connected to the coupling device 100. According to such a configuration, the predetermined power supply units can be ensured as emergency power supplies in terms of business continuity planning (BCP) or the like.

Variation 4

A Variation 4 of the second embodiment will be described below. In the following, differences from the second embodiment will be mainly described.

In the Variation 4, at least one of the controller 116C of the power conversion device 110 or the controller 283 of the power supply unit 200 executes control, as the predetermined control, based on pairing between the power supply unit 200 and the coupling device 100 in accordance with a mounting process of mounting the power supply unit 200 in the coupling device 100. For example, the control based on the pairing may include the control illustrated below.

Firstly, a case will be considered in which two or more coupling devices 100 are disposed in close proximity to each other, and the communication between the power conversion device 110 and the power supply unit 200 is wireless communication. In such a case, the power conversion device 110 obtains identification information of the power supply unit 200 from the power supply unit 200 connected to a corresponding one of the coupling devices 100 by wireless communication, and obtains the identification information of the power supply unit 200 by a method other than the wireless communication. The power conversion device 110 establishes wireless communication in a case where the two pieces of identification information match, and reports an error without establishing the wireless communication in a case where the two pieces of identification information do not match. A method other than the wireless communication may include power line communication (PLC), or may include near-field communication represented by a radio frequency identifier (RFID). Such a process may be executed on the power supply unit 200 side.

Secondly, a case will be considered in which the coupling device 100 to which the power supply unit 200 is to be connected is determined in advance. In such a case, the power conversion device 110 manages in advance the identification information of the power supply unit 200 to be connected to the coupling device 100, and receives the identification information of the power supply unit 200 from the power supply unit connected to the coupling device 100. The power conversion device 110 determines that the connection is appropriate in a case where the two pieces of identification information match, and determines that the connection is inappropriate in a case where the two pieces of identification information do not match. In a case where the connection is inappropriate, the power conversion device 110 may report that the connection is inappropriate, or may limit the connection by the switching unit 130 being OFF or the like. Such a process may be executed on the power supply unit 200 side.

Control Method

A control method according to the Variation 4 will be described below. Here, one power supply unit 200 to be paired will be described as an example.

Figure 18:
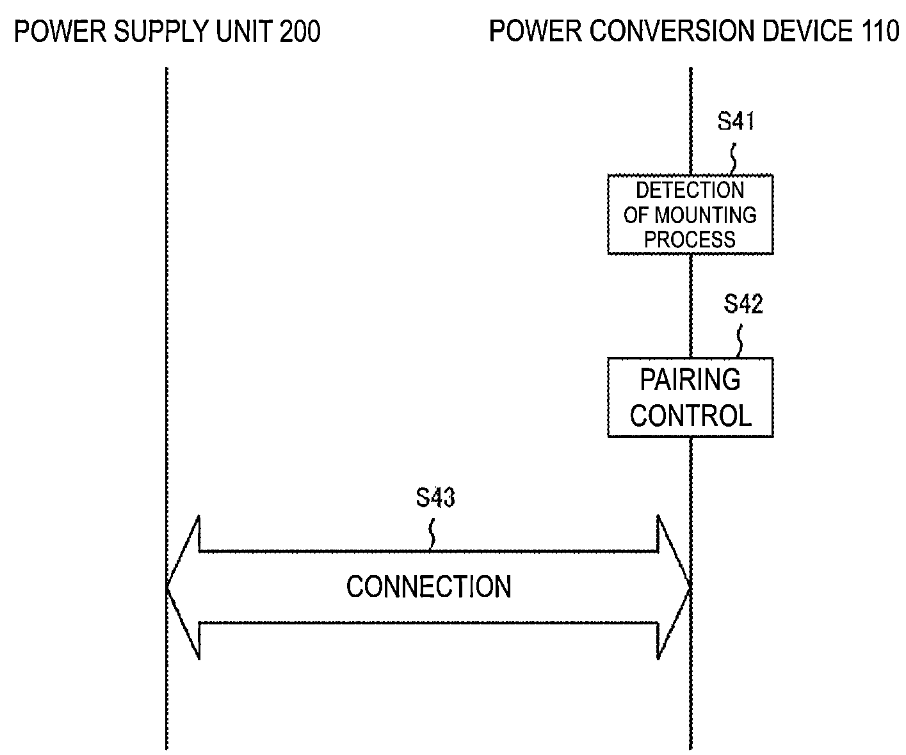
FIG. 18 is a diagram illustrating a control method according to a Variation 4 of the second embodiment.

As illustrated in FIG. 18, in step S41, the power conversion device 110 detects a mounting process of mounting the power supply unit 200 in the coupling device 100. The mounting process may be detected by the power supply unit 200 being mounted in the housing bay 120, or may be detected by the button provided in the housing bay 120 being pressed down.

In step S42, the power conversion device 110 executes control based on the pairing between the power supply unit 200 and the coupling device 100. Details of the control based on the pairing are as described above.

In step S43, in a case where the pairing is appropriate, the power conversion device 110 connects the power supply unit 200 to the coupling device 100. In a case where the pairing is inappropriate, the power conversion device 110 does not connect the power supply unit 200 to the coupling device 100. Note that in a case where the power conversion device 110 determines that the pairing is inappropriate in a state where the power supply unit 200 is connected to the coupling device 100, the power conversion device 110 may disconnect the power supply unit 200 from the coupling device 100.

In FIG. 18, a case is illustrated in which the process is executed on the power conversion device 110 side, but such a process may be executed on the power supply unit 200 side.

Actions and Effects

In the Variation 4, the predetermined control includes the control based on the pairing between the power supply unit 200 and the coupling device 100. According to such a configuration, even in a case where the various power supply units 200 can be mounted in the coupling device 100, inappropriate pairing can be suppressed.

Third Embodiment

A third embodiment will be described below. In the following, differences from the first embodiment described above will be mainly described.

Usage Scenarios

Usage scenarios according to the third embodiment will be described below. Here, a usage scenario will be described in which two or more power supply units 200 cooperate with each other in a state where the two or more power supply units 200 are detached from the coupling device 100.

Firstly, a case will be described in which the two or more power supply units 200 are connected to each other in series.

Figure 19:
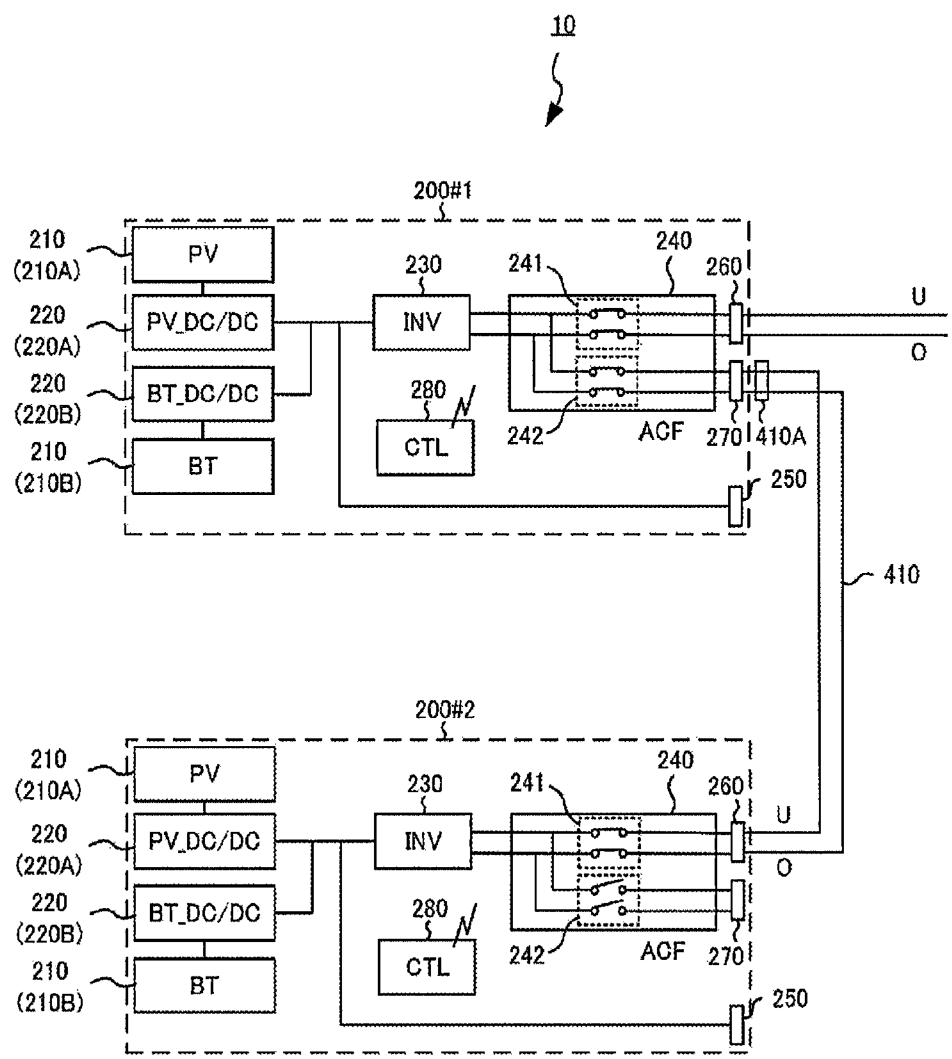
FIG. 19 is a diagram illustrating a connection example of two or more power supply units 200 according to a third embodiment.

As illustrated in FIG. 19, a first power supply unit 200#1 and a second power supply unit 200#2 will be illustrated as the two or more power supply units 200. The first power supply unit 200#1 and the second power supply unit 200#2 are connected to each other in series by coupling cables 410. A first end of each of the coupling cables 410 is connected to the second electrical power interface 260 of the second power supply unit 200#2, and a second end of each of the coupling cables 410 is connected to the third electrical power interface 270 of the first power supply unit 200#1. The second end of each of the coupling cables 410 may include a connector 410A for connecting to the third electrical power interface 270.

Under such a premise, the second electrical power interface 260 included in the first power supply unit 200#1 constitutes a specific electrical power interface for outputting alternating current power in a state where the two or more power supply units 200 cooperate with each other.

Here, for the first power supply unit 200#1, both the switching unit 241 and the switching unit 242 are ON. On the other hand, for the second power supply unit 200#2, the switching unit 241 is ON, but the switching unit 242 is OFF. Thus, the third electrical power interface 270 of the second power supply unit 200#2 is not used.

In the case illustrated in FIG. 19, synchronization information for aligning a phase, a voltage, and the like of alternating current power may be transmitted from the first power supply unit 200#1 to the second power supply unit 200#2. The second power supply unit 200#2 aligns the phase, the voltage, and the like of the alternating current power with those of the first power supply unit 200#1 based on the synchronization information. Alternatively, synchronization information for aligning the phase, the voltage, and the like of the alternating current power may be transmitted from the second power supply unit 200#2 to the first power supply unit 200#1. The first power supply unit 200#1 aligns the phase, the voltage, and the like of the alternating current power with those of the second power supply unit 200#2 based on the synchronization information. The communication of the synchronization information may be executed by the communicator 281 of the controller 283.

In FIG. 19, a case is described in which two power supply units 200 are connected to each other in series; however, three or more power supply units 200 may be connected to each other in series.

Secondly, a case will be described in which two or more power supply units 200 are connected to each other in parallel.

Figure 20:
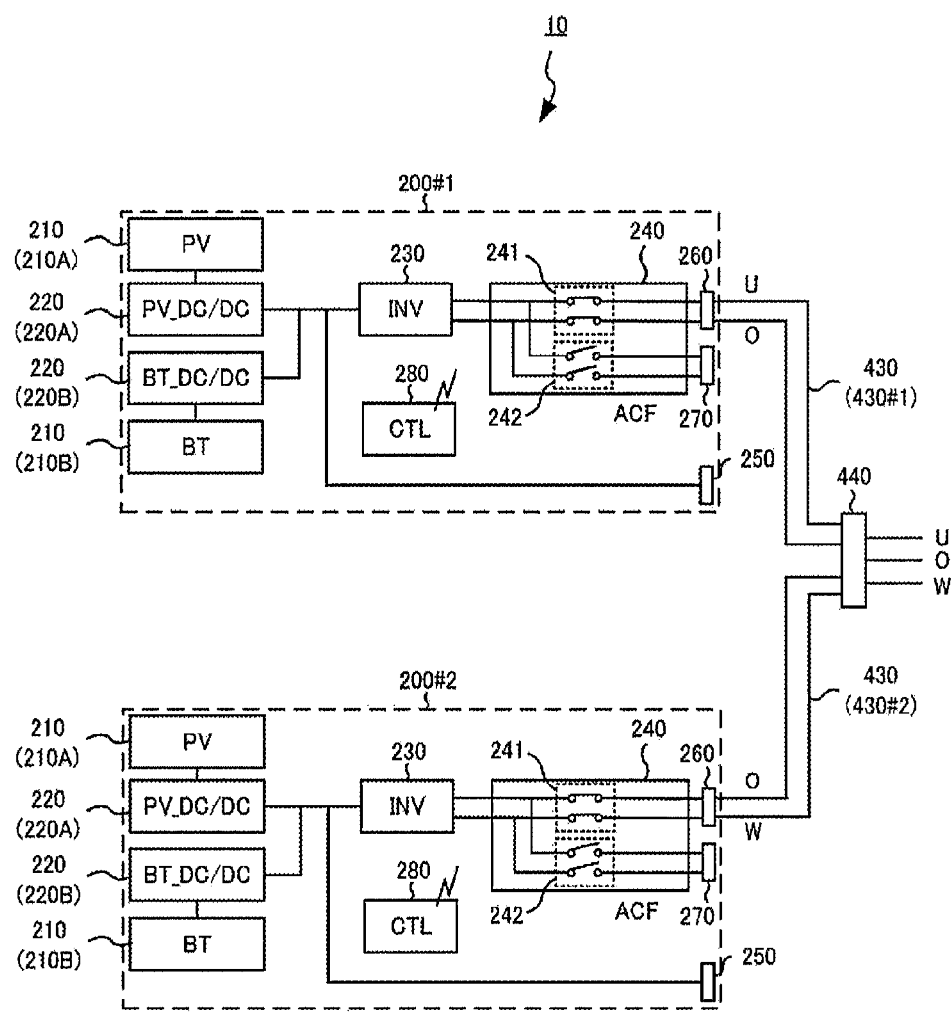
FIG. 20 is a diagram illustrating a connection example of two or more power supply units 200 according to the third embodiment.

As illustrated in FIG. 20, a first power supply unit 200#1 and a second power supply unit 200#2 will be illustrated as the two or more power supply units 200. The first power supply unit 200#1 and the second power supply unit 200#2 are connected to each other in parallel by coupling cables 430. Specifically, the second electrical power interface 260 of the first power supply unit 200#1 is connected to a transformer 440 by a coupling cable 430#1, and the second electrical power interface 260 of the second power supply unit 200#2 is connected to the transformer 440 by a coupling cable 430#2.

Under such a premise, the transformer 440 is connected to single-phase two-wire interfaces included in the first power supply unit 200#1 and the second power supply unit 200#2, and outputs alternating current power from a single-phase three-wire interface. In other words, the transformer 440 constitutes a specific electrical power interface for outputting alternating current power in a state where the two or more power supply units 200 cooperate with each other.

Here, for the first power supply unit 200#1 and the second power supply unit 200#2, the switching unit 241 is ON, but the switching unit 242 is OFF. Accordingly, the third electrical power interface 270 of each of the first power supply unit 200#1 and the second power supply unit 200#2 is not used.

In the case illustrated in FIG. 20, synchronization information for aligning the phase, the voltage, and the like of the alternating current power may be transmitted from the first power supply unit 200#1 to the second power supply unit 200#2. The second power supply unit 200#2 aligns the phase, the voltage, and the like of the alternating current power with those of the first power supply unit 200#1 based on the synchronization information. Alternatively, synchronization information for aligning the phase, the voltage, and the like of the alternating current power may be transmitted from the second power supply unit 200#2 to the first power supply unit 200#1. The first power supply unit 200#1 aligns the phase, the voltage, and the like of the alternating current power with those of the second power supply unit 200#2 based on the synchronization information. The communication of the synchronization information may be executed by the communicator 281 of the controller 283.

In FIG. 20, a case is described in which two power supply units 200 are connected to each other in parallel, but three or more power supply units 200 may be connected to each other in parallel.

Control Method

The control method according to the third embodiment will be described below. Although two power supply units 200 are illustrated here, in practice, three or more power supply units 200 may be connected.

Firstly, a case will be described in which synchronization information is transmitted from the first power supply unit 200#1 to the second power supply unit 200#2.

Figure 21:
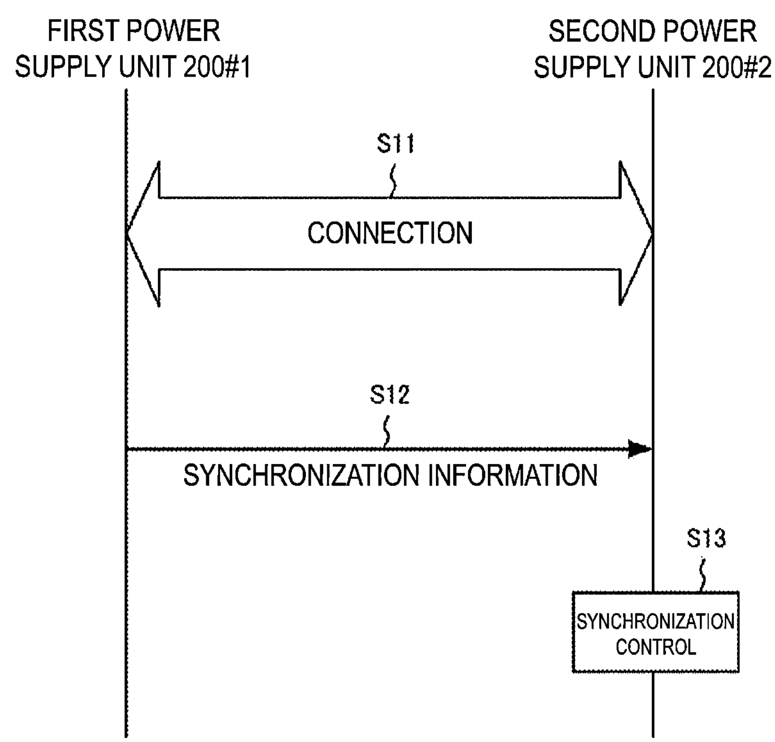
FIG. 21 is a diagram illustrating a control method according to the third embodiment.

As illustrated in FIG. 21, in step S11, the first power supply unit 200#1 and the second power supply unit 200#2 are connected to each other. A connection mode may be a series mode illustrated in FIG. 19, or may be a parallel mode illustrated in FIG. 20.

In step S12, the first power supply unit 200#1 transmits synchronization information to the second power supply unit 200#2. The synchronization information includes information indicating the phase, the voltage, and the like of the alternating current power output from the first power supply unit 200#1.

In step S13, the second power supply unit 200#2 aligns the phase, the voltage, and the like of the alternating current power with those of the first power supply unit 200#1 based on the synchronization information (synchronization control).

Secondly, a case will be described in which the synchronization information is transmitted from the second power supply unit 200#2 to the first power supply unit 200#1.

Figure 22:
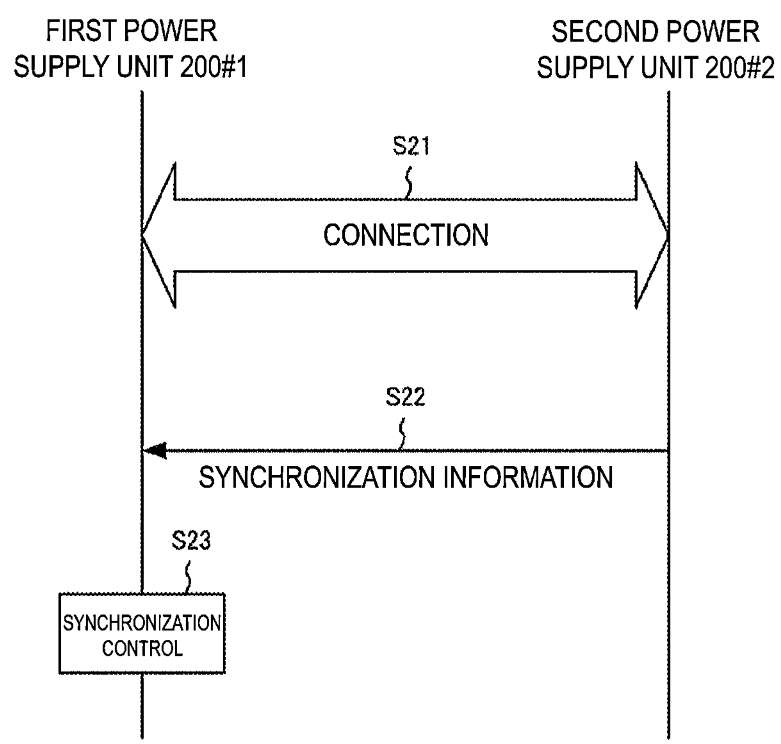
FIG. 22 is a diagram illustrating a control method according to the third embodiment.

As illustrated in FIG. 22, in step S21, the first power supply unit 200#1 and the second power supply unit 200#2 are connected to each other. The connection mode may be the series mode illustrated in FIG. 19, or may be the parallel mode illustrated in FIG. 20.

In step S22, the second power supply unit 200#2 transmits the synchronization information to the first power supply unit 200#1. The synchronization information includes information indicating the phase, the voltage, and the like of the alternating current power output from the second power supply unit 200#2.

In step S23, the first power supply unit 200#1 aligns the phase, the voltage, and the like of the alternating current power with those of the second power supply unit 200#2 based on the synchronization information (synchronization control).

Actions and Effects

In the third embodiment, the power supply units 200 can be used in the state of being detached from the coupling device 100. In other words, the power supply units 200 can be used as emergency power supplies. The power supply units 200 can also be used in the state of being mounted in the coupling device 100. In other words, the power supply units 200 can be used at a normal time other than an emergency time. In such a case, since the power supply units 200 and the power conversion device 110 are DC-link-connected to each other, conversion loss between the direct current and the alternating current can be suppressed. As described above, the usage scenarios of the power supply units 200 can be expanded.

In the third embodiment, the two or more power supply units 200 cooperate with each other in a state where the two or more power supply units 200 are detached from the coupling device 100. According to such a configuration, the usage scenarios of the power supply units 200 can be further expanded.

Variation 1

A Variation 1 of the third embodiment will be described below. In the following, differences from the third embodiment will be mainly described.

In the Variation 1, a usage scenario will be described in which two or more power supply units 200 cooperate with each other in a state where the two or more power supply units 200 are detached from the coupling device 100. The two or more power supply units 200 are connected to each other in series as in FIG. 19. In the following, differences from FIG. 19 will be described.

Figure 23:
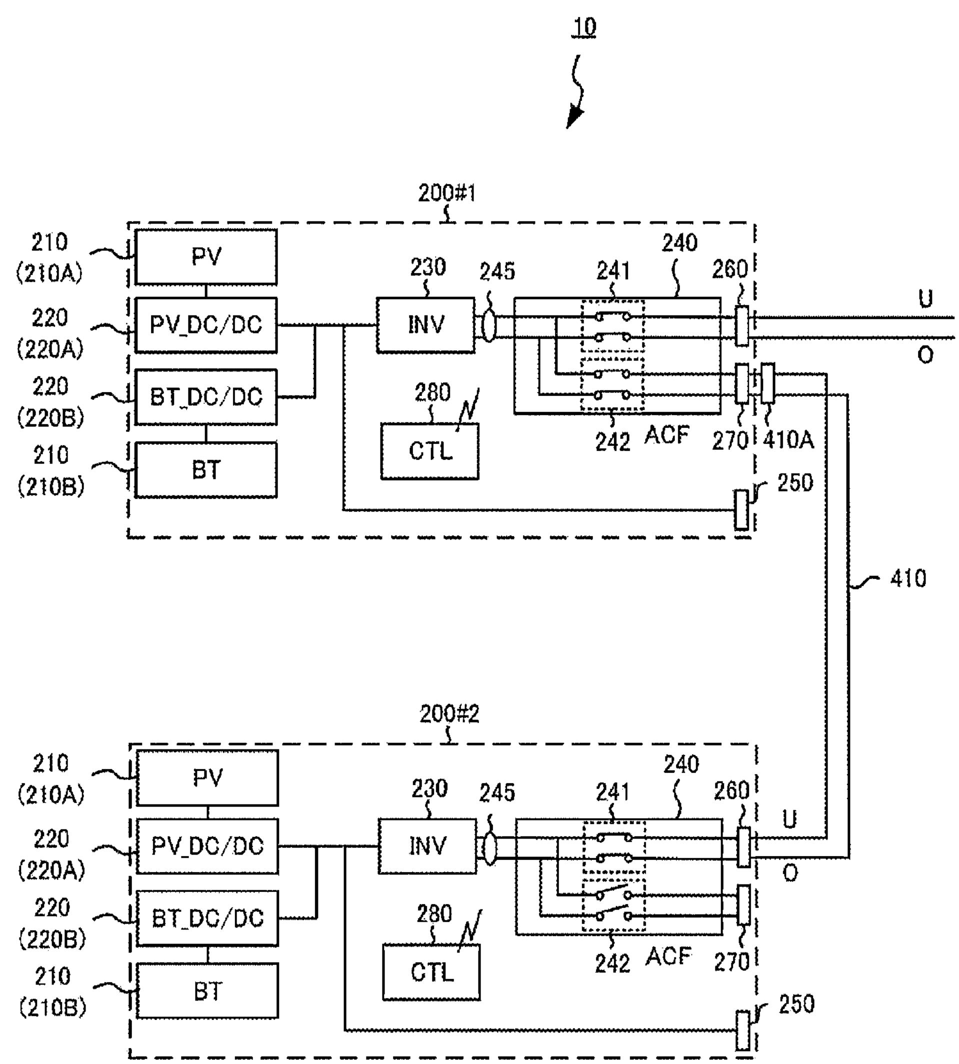
FIG. 23 is a diagram illustrating a connection example of two or more power supply units 200 according to a Variation 1 of the third embodiment.

As illustrated in FIG. 23, each power supply unit 200 includes a detection unit 245 provided at an output end of the individual converter 230. The detection unit 245 detects a voltage and a current of the alternating current power output from the individual converter 230.

For example, a case will be described in which after starting the output of the first power supply unit 200#1, the output of the second power supply unit 200#2 is started. Firstly, the first power supply unit 200#1 outputs alternating current power such that a voltage value detected by the detection unit 245 is 100 V in response to the user operation of starting the output. Secondly, the second power supply unit 200#2 outputs alternating current power such that a voltage value detected by the detection unit 245 is 100 V in response to the user operation of starting the output. In such a case, in a case where the user operation of stopping the output is executed on the first power supply unit 200#1, the second power supply unit #2 may stop the output interlocked with stoppage of the output of the first power supply unit 200#1.

In a case where communication can be executed between the first power supply unit 200#1 and the second power supply unit 200#2, the first power supply unit 200#1 and the second power supply unit 200#2 may transmit information indicating a current value detected by the detection unit 245 to each other. The first power supply unit 200#1 and the second power supply unit 200#2 may control the current output from the individual converter 230 based on the current value detected by the detection unit 245 such that the output currents of the power supply units 200 are equal.

The first power supply unit 200#1 and the second power supply unit 200#2 may transmit information indicating the available output capacities of the distributed power supplies 210 to each other. The first power supply unit 200#1 and the second power supply unit 200#2 may control the current output from the individual converter 230 in accordance with a ratio of the available output capacities of the distributed power supplies 210. For example, the first power supply unit 200#1 and the second power supply unit 200#2 may output a larger current as the ratio of the available output capacities becomes higher.

The first power supply unit 200#1 and the second power supply unit 200#2 may transmit information indicating the remaining power storage level of the power storage device 210B to each other. The first power supply unit 200#1 and the second power supply unit 200#2 may control the current output from the individual converter 230 in accordance with a ratio of the remaining power storage level of the power storage device 210B. For example, the first power supply unit 200#1 and the second power supply unit 200#2 may output a larger current as the ratio of the remaining power storage level becomes higher.

The first power supply unit 200#1 and the second power supply unit 200#2 may transmit information indicating the degrees of deterioration of the distributed power supplies 210 to each other. The first power supply unit 200#1 and the second power supply unit 200#2 may control the current output from the individual converter 230 in accordance with a ratio of the degrees of deterioration of the distributed power supplies 210. For example, the first power supply unit 200#1 and the second power supply unit 200#2 may output a larger current as the ratio of the degree of deterioration becomes higher. Here, the degree of deterioration is a parameter meaning that the higher the degree of deterioration, the more the deterioration progresses.

Actions and Effects

In the Variation 1, each power supply unit 200 includes the detection unit 245 provided at the output end of the individual converter 230. According to such a configuration, two or more power supply units 200 can appropriately cooperate with each other.

Fourth Embodiment

A fourth embodiment will be described below. In the following, differences from the first embodiment described above will be mainly described.

Usage Scenarios

Usage scenarios according to the fourth embodiment will be described below. Here, a usage scenario will be described in which the distributed power supplies 210 include at least the power storage device 210B, and the power supply unit 200 is used in a state of being detached from the coupling device 100.

In such a case, the controller 283 of the power supply unit 200 executes at least one of charge control that charges the power storage device 210B with the alternating current power input from the third electrical power interface 270 or discharge control that outputs the alternating current power from the second electrical power interface 260 with the direct current power output from the power storage device 210B.

Figure 24:
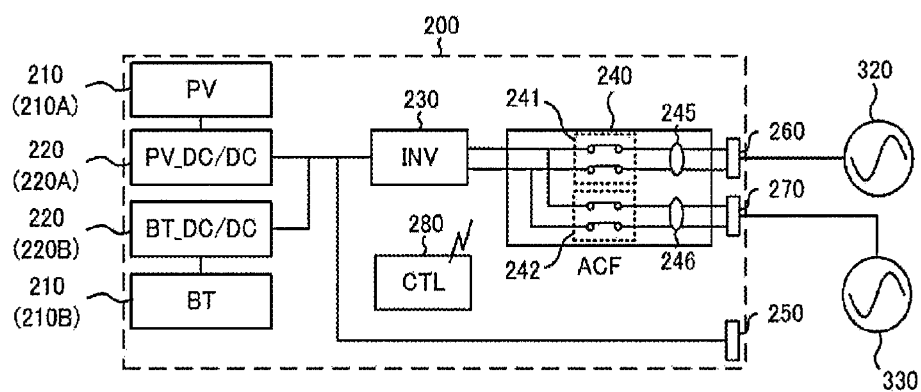
FIG. 24 is a diagram illustrating a power supply unit 200 according to a fourth embodiment.

Specifically, as illustrated in FIG. 24, the power supply unit 200 includes a detection unit 245 and a detection unit 246. The detection unit 245 is an example of a first detection unit for detecting a voltage and a current between the individual converter 230 and the second electrical power interface 260. The detection unit 245 may be provided on a power line between the switching unit 241 and the second electrical power interface 260. The detection unit 246 is an example of a second detection unit that detects the voltage and the current between the individual converter 230 and the third electrical power interface 270. The detection unit 246 may be provided on a power line between the switching unit 242 and the third electrical power interface 270. The controller 283 executes at least one of charge control or discharge control of the power storage device 210B based on a detection result of at least one of the detection unit 245 or the detection unit 246.

Firstly, in a case where the input power is detected by the detection unit 246, the controller 283 determines that the electrical power system 330 is connected to the third electrical power interface 270. In such a case, the controller 283 controls the switching unit 242 to be ON and executes charge control of the power storage device 210B by the alternating current power input from the electrical power system 330.

In a case where the output power is detected by the detection unit 245, the controller 283 determines that the electrical power system 320 is connected to the second electrical power interface 260. In such a case, the controller 283 controls the switching unit 241 to be ON, and supplies the power supplied from the electrical power system 330 to the electrical power system 320 at the same time as the charge control of the power storage device 210B. On the other hand, in a case where the output power is not detected by the detection unit 245, the controller 283 determines that the electrical power system 320 is not connected to the second electrical power interface 260. In such a case, the controller 283 controls the switching unit 241 to be OFF and executes charge control of the power storage device 210B.

Secondly, in a case where the input power is not detected by the detection unit 246, the controller 283 determines that the electrical power system 330 is not connected to the third electrical power interface 270. In such a case, the controller 283 controls the switching unit 242 to be OFF and stops the charge control of the power storage device 210B.

In a case where the electrical power system 320 is connected to the second electrical power interface 260, the controller 283 controls the switching unit 241 to be ON and executes discharge control of the power storage device 210B. In a case where the electrical power system 320 is not connected to the second electrical power interface 260, the controller 283 controls the switching unit 241 to OFF and does not execute discharge control of the power storage device 210B.

Note that, in a case where the electrical power system 320 is connected to the second electrical power interface 260 and the power supplied from the electrical power system 330 is insufficient, the controller 283 may stop the charge control of the power storage device 210B and execute discharge control of the power storage device 210B.

In the case illustrated in FIG. 24, the input power can also be detected by the detection unit 245. Accordingly, it is possible to deal with a case where the power is input from the second electrical power interface 260. In other words, it is also possible to connect the electrical power system 330 (power supply system) to the second electrical power interface 260. Similarly, the output power can be detected by the detection unit 246. Accordingly, it is possible to deal with a case where the power is output from the third electrical power interface 270. In other words, it is also possible to connect the electrical power system 320 (load system) to the third electrical power interface 270.

Actions and Effects

In the fourth embodiment, the power supply unit 200 can be used in the state of being detached from the coupling device 100. In other words, the power supply unit 200 can be used as an emergency power supply. The power supply unit 200 can also be used in a state of being mounted in the coupling device 100. In other words, the power supply unit 200 can be used at a normal time other than an emergency time. In such a case, since the power supply unit 200 and the power conversion device 110 are DC-link-connected to each other, the conversion loss between the direct current and the alternating current can be suppressed. As described above, the usage scenarios of the power supply unit 200 can be expanded.

In the fourth embodiment, the power supply unit 200 executes at least one of charge control that charges the power storage device 210B with the alternating current power input from the third electrical power interface 270 or discharge control that outputs alternating current power from the second electrical power interface 260 with the direct current power output from the power storage device 210B. According to such a configuration, even in a state of not being mounted in the coupling device 100, the power storage device 210B can be charged due to the presence of the third electrical power interface 270. Accordingly, the usage scenarios of the power supply unit 200 can be further expanded.

Variation 1

A Variation 1 of the fourth embodiment will be described below. In the following, differences from the fourth embodiment will be mainly described. Also in the Variation 1, a usage scenario will be described in which the power supply unit 200 is used in a state of being detached from the coupling device 100.

Figure 25:
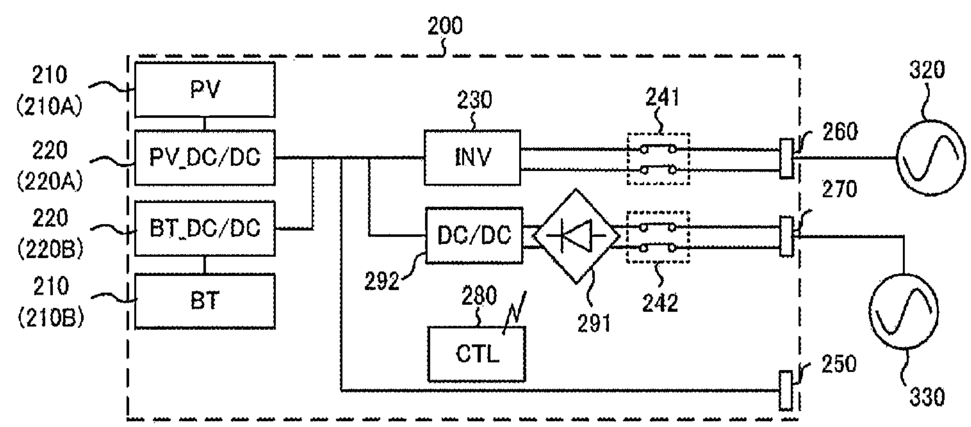
FIG. 25 is a diagram illustrating a power supply unit 200 according to a Variation 1 of the fourth embodiment.

In the Variation 1, the power supply unit 200 may include a rectifier circuit 291 and a converter 292 as illustrated in FIG. 25. The rectifier circuit 291 converts the alternating current power supplied from the electrical power system 330 into direct current power. The rectifier circuit 291 may be a full-wave rectifier circuit, or may be a half-wave rectifier circuit. The converter 292 is a DC/DC converter (DC/DC in FIG. 25) for converting a voltage of the direct current power output from the rectifier circuit 291. The rectifier circuit 291 and the converter 292 are one example of a second individual converter for converting the alternating current power input from the third electrical power interface 270 into direct current power. Note that an AC/DC converter may be used instead of the rectifier circuit 291 and the converter 292.

According to such a configuration, the controller 283 of the power supply unit 200 executes at least one of charge control that charges the power storage device 210B with the alternating current power input from the third electrical power interface 270 or discharge control that outputs alternating current power from the second electrical power interface 260 with the direct current power output from the power storage device 210B. In other words, without using the detection unit 245 and the detection unit 246 described in FIG. 24, the controller 283 can execute at least one of charge control or discharge control. The controller 283 can also simultaneously execute charge control and discharge control.

Note that in the case illustrated in FIG. 24, the electrical power system 330 (power supply system) can be connected to the second electrical power interface 260; however, in the case illustrated in FIG. 25, the electrical power system 330 (power supply system) need not be connected to the second electrical power interface 260.

Actions and Effects

In the Variation 1, by providing the rectifier circuit 291 and the converter 292, charge control and discharge control of the power storage device 210B can be appropriately executed without using the detection unit 245 and the detection unit 246 described in FIG. 24.

Variation 2

A Variation 2 of the fourth embodiment will be described below. In the following, differences from the fourth embodiment will be mainly described.

In the Variation 2, a case will be described in which the distributed power supplies 210 include, in addition to the power storage device 210B, a power generation device for generating power using renewable energy. The solar cell device 210A described above is an example of such a power generation device.

Figure 26:
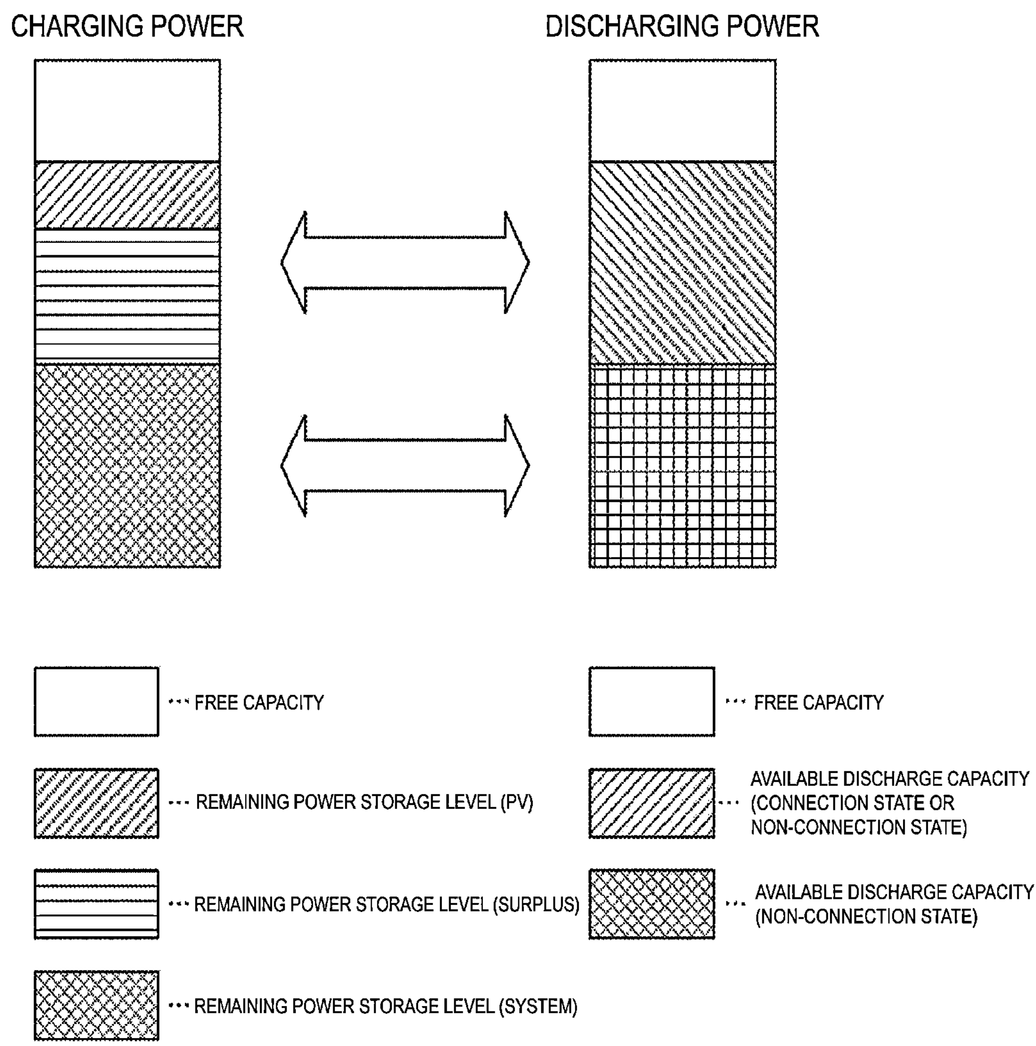
FIG. 26 is a diagram illustrating discharge control according to a Variation 2 of the fourth embodiment.

The controller 283 of the power supply unit 200 manages the remaining power storage level of the power storage device 210B charged by the direct current power output from the solar cell device 210A. For example, as illustrated in the left column in FIG. 26, the controller 283 manages the remaining power storage level of the power storage device 210B for each electrical power source used for charging the power storage device 210B. A remaining power storage level (PV) is a remaining power storage level in which the solar cell device 210A is the electrical power source. A remaining power storage level (surplus) is a remaining power storage level in which a reverse power flow electrical power is the electrical power source in a case where the alternating current power input from the third electrical power interface 270 is the reverse power flow electrical power. A remaining power storage level (system) is a remaining power storage level in which a power flow electrical power (purchased power) is the power source in a case where the alternating current power input from the third electrical power interface 270 is the power flow electrical power.

Here, in a state where the power supply unit 200 is not connected to the power conversion device 110 (hereinafter, non-connection state), the remaining power storage level (PV) may be an accumulated power of the output power of the solar cell device 210A. In a state where the power supply unit 200 is connected to the power conversion device 110 (hereinafter, connection state), the remaining power storage level (PV) may be an accumulated power of the power output from the solar cell device 210A in a period at which the reverse power flow to the electrical power system is generated (hereinafter, reverse power flow period) at the facility provided with the coupling device 100.

The remaining power storage level (surplus) may be an accumulated power of the power input from the third electrical power interface 270 in the reverse power flow period. The remaining power storage level (surplus) may be an accumulated power of the power charged to the power storage device 210B in the reverse power flow period. In such a case, the charging power using the output power of the solar cell device 210A may also be classified as the remaining power storage level (surplus).

In the connection state, the controller 283 may execute discharge control of the power storage device 210B via the second electrical power interface 260 within a range that does not exceed the remaining power storage level of the power storage device 210B charged by the direct current power output from the solar cell device 210A.

In the connection state, in a case where the power input from the third electrical power interface 270 is the reverse power flow electrical power to the electrical power system, the controller 283 may execute discharge control of the power storage device 210B via the second electrical power interface 260 within a range that does not exceed the remaining power storage level of the power storage device 210B charged by the reverse power flow electrical power.

The available discharge capacity of the power storage device 210B in the connection state may be the remaining power storage level (PV), may be the remaining power storage level (surplus), or may be the sum of the remaining power storage level (PV) and the remaining power storage level (surplus).

Note that in the non-connection state, the controller 283 need not limit the discharge control of the power storage device 210B via the second electrical power interface 260. In other words, the available discharge capacity of the power storage device 210B in the non-connection state may be the sum of the remaining power storage level (PV), the remaining power storage level (surplus), and the remaining power storage level (system).

Here, the controller 283 needs to determine whether the reverse power flow to the electrical power system occurs at the facility provided with the coupling device 100. The communicator 281 described above may receive information indicating whether the reverse power flow occurs, from a power meter or energy management system (EMS) of the facility provided with the coupling device 100. The power meter of the facility may include a power meter provided in a distribution board separately from a smart meter. The communicator 281 may receive information indicating the reverse power flow electrical power or the power flow electrical power, in addition to the information indicating whether the reverse power flow occurs.

Actions and Effects

In the Variation 2, the power supply unit 200 executes discharge control of the power storage device 210B based on the electrical power source used for charging the power storage device 210B. According to such a configuration, conversion loss between the alternating current power and the direct current power can be suppressed. For example, the conversion loss caused by unnecessary discharge control is suppressed by suppressing discharge control using the remaining power storage level (system) of the power storage device 210B charged by the purchased power in the connection state.

Variation 3

A Variation 3 of the fourth embodiment will be described below. In the following, differences from the fourth embodiment will be mainly described. In the Variation 3, a charge method of charging the power storage device 210B will be described.

The controller 283 of the power supply unit 200 may execute the following control in a case where the voltage of the power storage device 210B reaches a predetermined voltage in the charge control. The controller 283 may execute charging of the power storage device 210B by constant current charging until the voltage of the power storage device 210B reaches the predetermined voltage.

Specifically, the controller 283 executes charge control of the power storage device 210B by constant voltage charging in the case where the power storage device 210B is charged by the direct current power output from the solar cell device 210A. On the other hand, the controller 283 stops charge control of the power storage device 210B in the case where the power storage device 210B is charged by the alternating current power input from the third electrical power interface 270.

Here, the predetermined voltage is a voltage at which the efficiency of the constant current charging is equal to a threshold value or less. The predetermined voltage may be a voltage corresponding to a state of charge (SOC) less than 100%.

Control Method

A control method according to the Variation 3 will be described below.

Figure 27:
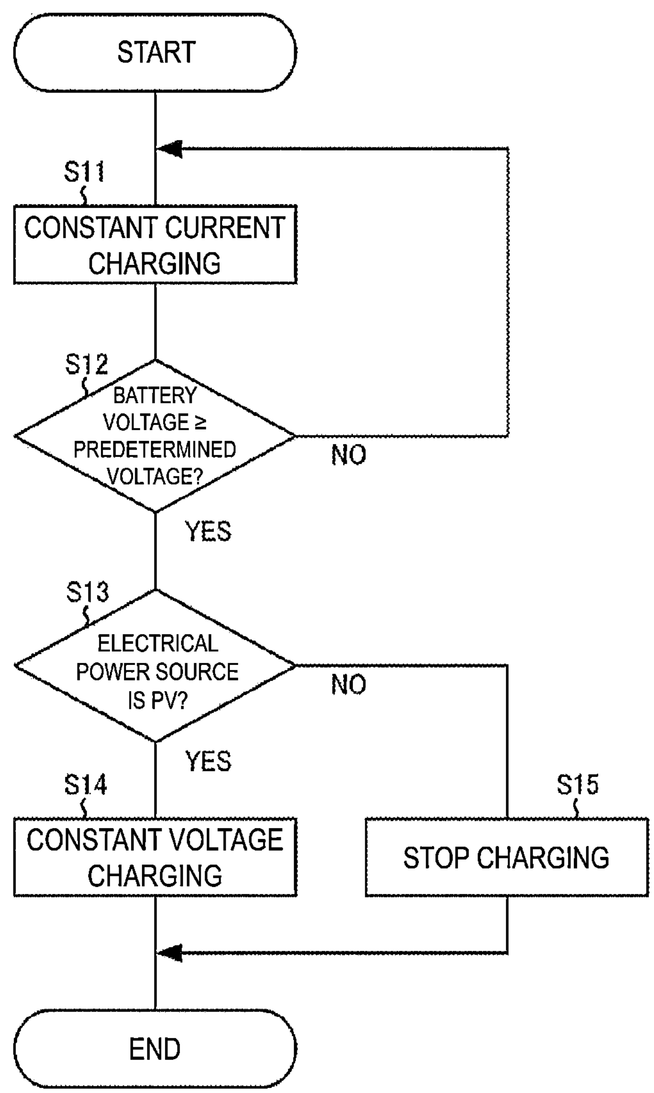
FIG. 27 is a diagram illustrating a control method according to a Variation 3 of the fourth embodiment.

As illustrated in FIG. 27, in step S11, the power supply unit 200 executes charging of the power storage device 210B by constant current charging.

In step S12, the power supply unit 200 determines whether the voltage of the power storage device 210B has reached a predetermined voltage.

In step S13, the power supply unit 200 determines whether the electrical power source used for charging the power storage device 210B is the solar cell device 210A. If the determination result is YES, then a process in step S14 is executed. If the determination result is NO, then a process in step S15 is executed. For example, the case where the determination result is NO is a case where the electrical power source used for charging the power storage device 210B is the alternating current power input from the third electrical power interface 270. Such a case includes a case where the power flow electrical power (purchased power) is generated at the facility provided with the coupling device 100.

In step S14, the power supply unit 200 executes charge control of the power storage device 210B by constant voltage charging.

In step S15, the power supply unit 200 stops charge control of the power storage device 210B.

Actions and Effects

In the Variation 3, the power supply unit 200 executes charge control of the power storage device 210B based on the electrical power source used for charging the power storage device 210B. According to such a configuration, inefficient charge control using the purchased power can be suppressed. On the other hand, by allowing inefficient charge control using the output power of the solar cell device 210A, the SOC of the power storage device 210B can be brought close to 100%.

Other Embodiments

Although the present invention is described by the above-described disclosure, it should not be understood that the description and the drawings, which form a part of this disclosure, limit this invention. Various alternative embodiments, examples, and operational techniques will be apparent from this disclosure to those skilled in the art.

In the disclosure described above, a case is illustrated in which the coupling device 100 includes the housing bay 120 housing the one or more power supply units 200. However, the disclosure described above is not limited to this example. Specifically, it is sufficient that the one or more power supply units 200 be detachable from the coupling device 100. Accordingly, each of the one or more power supply units 200 may be connected to the coupling device 100 by a cable. In other words, each of the one or more power supply units 200 may be configured so as to be detachable from the coupling device 100 by inserting and removing a plug provided in the cable.

In the disclosure described above, a case is illustrated in which the display unit 200X is provided in each power supply unit 200. However, the disclosure described above is not limited to this example. For example, in a case where the power supply unit 200 is connected to the coupling device 100 by a cable, the display unit 200X may be provided in a plug provided in the cable.

In the first embodiment, the controller for controlling at least one of the power supply unit 200 or the power conversion device 110 based on communication information obtained by communication between the power supply unit 200 and the power conversion device 110 is the controller 116C of the power conversion device 110 and the controller 283 of the power supply unit 200. However, the first embodiment is not limited to this example. The controller may be a controller for a device (for example, an energy management system (EMS)) capable of communicating with the power conversion device 110 and the power supply unit 200. The EMS may be provided in the coupling device 100 or may be provided by a cloud service.

In the second embodiment, the controller that executes predetermined control related to the connection state of the power supply unit 200 to the coupling device 100 is the controller 116C of the power conversion device 110 and the controller 283 of the power supply unit 200. However, the second embodiment is not limited to this example. The controller may be a controller for a device (for example, EMS) capable of communicating with the power conversion device 110 and the power supply unit 200. The EMS may be provided in the coupling device 100 or may be provided by a cloud service.

In the second embodiment, the communication information transmitted from the power supply unit 200 to the power conversion device 110 includes the information indicating the available output capacities of the distributed power supplies 210. However, the second embodiment is not limited to this example. The communication information may include information indicating the degrees of deterioration of the distributed power supplies 210. The communication information may include information indicating the remaining power storage level of the power storage device 210B.

In the third embodiment, the controller that executes the synchronization control is the controller 283 of the power supply unit 200. However, the third embodiment is not limited to this example. The controller may be a controller for a device (for example, EMS) capable of communicating with the power supply unit 200. The EMS may be provided in the coupling device 100 or may be provided by a cloud service.

In the third embodiment, the communication information transmitted from the power supply unit 200 to the power conversion device 110 includes the information indicating the available output capacities of the distributed power supplies 210. However, the third embodiment is not limited to this example. The communication information may include information indicating the degrees of deterioration of the distributed power supplies 210. The communication information may include information indicating the remaining power storage level of the power storage device 210B.

In the fourth embodiment, the controller that executes the charge control and the discharge control is the controller 283 of the power supply unit 200. However, the fourth embodiment is not limited to this example. The controller may be a controller for a device (for example, EMS) capable of communicating with the power supply unit 200. The EMS may be provided in the coupling device 100 or may be provided by a cloud service.

In the fourth embodiment, the communication information transmitted from the power supply unit 200 to the power conversion device 110 includes the information indicating the available output capacities of the distributed power supplies 210. However, the fourth embodiment is not limited to this example. The communication information may include information indicating the degrees of deterioration of the distributed power supplies 210. The communication information may include information indicating the remaining power storage level of the power storage device 210B.

In the disclosure described above, the solar cell device 210A and the power storage device 210B are illustrated as the distributed power supplies 210. However, the disclosure described above is not limited to this example. The distributed power supplies 210 may include the fuel cell device. The distributed power supplies 210 may include a wind power generation device and a biomass power generation device, and may include a geothermal power generation device. Note that the wind power generation device, the biomass power generation device, and the geothermal power generation device are examples of power generation devices for generating power using renewable energy.

In the disclosure described above, a case is illustrated in which the interfaces that output electrical power from the power conversion device 110 are single-phase. However, the disclosure described above is not limited to this example. The interfaces that output electrical power from the power conversion device 110 may be three-phase.

Although not particularly described in the disclosure described above, the available output capacities of the distributed power supplies 210 may be identified by prediction. For example, the available output capacity of the solar cell device 210A may be predicted based on weather information (weather, solar radiation, temperature, humidity, or the like). In a case where the fuel cell device is a polymer electrolyte fuel cell (PEFC), the available output capacity of the PEFC may be predicted based on a hot water amount or hot water temperature obtained by exhaust heat utilization.

Although not particularly described in the disclosure described above, the connection between the coupling device 100 and the power supply unit 200 may mean that the power supply unit 200 is mounted in the coupling device 100, and may mean that after the power supply unit 200 is mounted, the power supply unit 200 is electrically connected to the coupling device 100 by the switching unit 130 being ON.

Although not particularly described in the disclosure described above, the disconnection between the coupling device 100 and the power supply unit 200 may mean that the switching unit 130 is turned OFF, and may mean that after the switching unit 130 is turned OFF, the power supply unit 200 is detached from the coupling device 100.

Although not particularly described in the disclosure described above, the communication information may be transmitted from the power supply unit 200 to the power conversion device 110 via an external device (the EMS, a server, or the like). Similarly, the communication information may be transmitted from the power conversion device 110 to the power supply unit 200 via the external device (the EMS, the server, or the like).

Although not particularly described in the disclosure described above, the electrical power may be an instantaneous value (kW) or may be an integrated value per unit time (kWh).

The invention claimed is:

1. A power supply system comprising:

a coupling device comprising a power conversion device;

one or more power supply units detachable from the coupling device, each of the one or more power supply units comprising a distributed power supply, a first electrical power interface configured to output direct current power output from the distributed power supply to the power conversion device, an individual converter configured to convert the direct current power output from the distributed power supply to alternating current power, and a second electrical power interface configured to output the alternating current power output from the individual converter, and the power conversion device comprising a coupling side converter configured to convert the direct current power output from the one or more power supply units to alternating current power, and a coupling side electrical power interface configured to output the alternating current power output from the coupling side converter; and a controller configured to control at least one of a corresponding one of the one or more power supply units or the power conversion device based on communication information obtained by communication between the corresponding one of the one or more power supply units and the power conversion device.

2. The power supply system according to claim 1, wherein the coupling side electrical power interface comprises two or more electrical power interfaces having different output voltages, and in a case where the number of the one or more power supply units connected to the coupling device is two or more, the controller outputs alternating current power from an electrical power interface selected from among the two or more electrical power interfaces.

3. The power supply system according to claim 1, wherein the communication information comprises information indicating an available output capacity of the distributed power supply, and the controller controls a maximum output capacity of the coupling side electrical power interface based on the available output capacity of the distributed power supply.

4. The power supply system according claim 2, wherein the communication information comprises information indicating an available output capacity of the distributed power supply, the controller controls a maximum output capacity of the coupling side electrical power interface based on the available output capacity of the distributed power supply, and the controller selects an electrical power interface configured to output alternating current power from among the two or more electrical power interfaces based on the available output capacity of the distributed power supply.

5. The power supply system according to claim 1, wherein the communication information comprises information indicating a reference voltage used in the first electrical power interface, and the controller adjusts a voltage of the first electrical power interface based on the reference voltage.

6. The power supply system according to claim 5, wherein the reference voltage is a voltage of direct current power input to the power conversion device.

7. The power supply system according to claim 1, wherein the communication information comprises information indicating a degree of deterioration of the distributed power supply, and the controller controls a connection relationship between a corresponding one of the one or more power supply units and the power conversion device based on the degree of deterioration of the distributed power supply.

8. The power supply system according to claim 7, wherein the distributed power supply comprises a power storage device, and the degree of deterioration is identified by the cumulative number of charges and discharges of the power storage device.

9. The power supply system according to claim 1, wherein the distributed power supply comprises a power storage device, the communication information comprises a remaining power storage level of the power storage device, and the controller controls at least one of charging or discharging of the power storage device based on the remaining power storage level of the power storage device.

10. The power supply system according to claim 9, wherein the controller controls at least one of the charging or discharging of the power storage device based on a remaining power storage level to be ensured by the power storage device in a state where a corresponding one of the one or more power supply units is disconnected from the coupling device.

11. The power supply system according to claim 1, wherein the communication information is information transmitted to the power conversion device from a corresponding one of the one or more power supply units connected to the coupling device.

12. A coupling device comprising a power conversion device, the coupling device comprising:

a coupling side converter configured to convert direct current power output from one or more power supply units detachable from the coupling device to alternating current power;

a coupling side electrical power interface configured to output the alternating current power output from the coupling side converter; and a controller configured to control the power conversion device based on communication information received from the one or more power supply units.

13. A power supply unit detachable from a coupling device comprising a power conversion device, the power supply unit comprising:

a distributed power supply;

a first electrical power interface configured to output direct current power output from the distributed power supply to the power conversion device;

an individual converter configured to convert the direct current power output from the distributed power supply to alternating current power;

a second electrical power interface configured to output alternating current power output from the individual converter; and a controller configured to control the power supply unit based on communication information received from the power conversion device.

* * * * *